United States Patent [19]

Akagi

[11] Patent Number: 5,750,280
[45] Date of Patent: May 12, 1998

[54] FUEL CELL SYSTEM

[75] Inventor: Kosuke Akagi, Ikoma, Japan

[73] Assignee: Osaka Gas Co., Ltd., Osaka, Japan

[21] Appl. No.: 517,599

[22] Filed: Aug. 22, 1995

[30] Foreign Application Priority Data

Aug. 23, 1994 [JP] Japan ................... 6-198084
Mar. 29, 1995 [JP] Japan ................... 7-071168
Jun. 1, 1995 [JP] Japan ................... 7-134897

[51] Int. Cl.$^6$ ........................ H01M 8/12; H01M 8/24
[52] U.S. Cl. ........................ 429/32; 429/32; 429/34; 429/35; 429/38; 429/39
[58] Field of Search ................ 429/32, 34, 35, 429/38, 39, 12

[56] References Cited

U.S. PATENT DOCUMENTS

| 5,252,409 | 10/1993 | Akagi | 429/32 |
| 5,350,642 | 9/1994 | Akagi | 429/32 |
| 5,376,473 | 12/1994 | Akagi | 429/34 |
| 5,563,003 | 10/1996 | Suzuki et al. | 429/34 |

FOREIGN PATENT DOCUMENTS

| 501401 | 2/1992 | European Pat. Off. |
| 585709 | 9/1994 | European Pat. Off. |

*Primary Examiner*—Prince Willis, Jr.
*Assistant Examiner*—Carol Chaney
*Attorney, Agent, or Firm*—Felfe & Lynch

[57] ABSTRACT

A fuel cell system includes cells (40) in form of rectangular plates stacked in a spaced relationship to form a cell assembly (41), with intercellular passages (y) formed between the cells. Each cell is held by a pair of cell holders (5) and includes an electrolyte layer (1) having an oxygen electrode (2) applied to one surface thereof and a fuel electrode (3) applied to the other surface, and a passage-defining member (4) for defining intracellular passages (x) opposed to the oxygen electrode (2) or the fuel electrode (3). The intracellular passages (x) are open at one pair of opposite sides and closed at the other pair of opposite sides of each cell. The intercellular passages (y) are closed at open sides (40b) where the intracellular passages (x) are open, and open at closed sides (40c) where the intracellular passages (x) are closed. The cell holders (5) define notches (51) for receiving the opposite sides (40a) where the intracellular passages (x) are open. The notches (51) each include contact surfaces (53) for tight contact with the closed sides (40c) adjacent opposite ends of each of the open sides (40a), each of the notches having substantially the same depth as a thickness of one of the cells. The cell assembly (41) is formed by the cells (40) stacked with the open sides (40a) fitted into the notches (51) of opposed pairs of the cell holders (5).

29 Claims, 30 Drawing Sheets

Prior Art

FUEL CELL SYSTEM

BACKGROUND OF THE INVENTION

1. Field of the Invention

The present invention relates to a fuel cell system having a plurality of fuel cells stacked in a spaced relationship to form a cell assembly.

2. Description of the Related Art

A conventional fuel cell system as noted above is shown in FIG. 36, in which a plurality of cells are stacked to form a cell assembly with intercellular passages defined between adjacent cells. This fuel cell system includes pairs of first elongate partition members 31 and pairs of second elongate partition members 32 stacked alternately in parallel crosses, the second partition members 32 having substantially the same thickness as cells 40. Each cell 40 is disposed between an adjacent pair of second partition members 32, with opposite sides of cell 40 defining openings of intracellular passages "x" (which sides correspond to sides 40a in FIG. 2, and will be hereinafter referred to as the open sides) being disposed above the first partition members 31, to form a cell assembly 41. An intercellular passage "y" is defined by a pair of first partition members 31 between an adjacent pair of cells 40. These intercellular passages "y" are closed at end surfaces (which correspond to surfaces 40b in FIG. 2, and will be hereinafter referred to as the opening end surfaces) where the intracellular passages "x" are open. The intercellular passages "y" are open at end surfaces of cells 40 where the intracellular passages "x" are closed (which surfaces correspond to surfaces 40c in FIG. 2, and will be hereinafter referred to as the closed end surfaces). The intracellular passages "x" and intercellular passages "y" are partitioned from each other by the first partition members 31 and second partition members 32 in tight contact with peripheries of sides of cells 40 where the intracellular passages "x" are open (which sides will be hereinafter referred to as the closed sides).

Box-shaped gas duct defining members 33 are connected at opening sides thereof to the two sides of the cell assembly 41 where the intracellular passages "x" are open, to define a pair of intracellular passage gas ducts X1 and X2 communicating with the intracellular passages "x". Similar gas duct defining members 33 are connected at opening sides thereof to the two sides of the cell assembly 41 where the intercellular passages "y" are open, to define a pair of intercellular passage gas ducts Y1 and Y2 communicating with the intercellular passages "y". One of the intracellular passage gas ducts X1 and X2 is used for supplying an intracellular passage gas to the intracellular passages "x", and the other for exhausting the intracellular passage gas from the intracellular passages "x". One of the intercellular passage gas ducts Y1 and Y2 is used for supplying an intercellular passage gas to the intercellular passages "y", and the other for exhausting the intercellular passage gas from the intercellular passages "y".

The conventional structure noted above is complicated in that the pairs of first partition members and the pairs of second partition members are stacked alternately in parallel crosses. Moreover, each cell requires one pair of first partition members and one pair of second partition members, i.e. four components. Thus, a great number of components are required to stack a plurality of cells.

In addition, four box-shaped gas duct defining members of complicated structure are required to define the intracellular passage gas ducts and intercellular passage gas ducts.

Thus, the fuel cell system requires a complicated stacking structure for forming the cell assembly, and a complicated gas duct defining structure for forming the intracellular passage gas ducts and intercellular passage gas ducts. These structures in combination result in a very complicated overall construction of the fuel cell system.

SUMMARY OF THE INVENTION

The present invention has been made having regard to the state of the art noted above, and its object is to provide a fuel cell system of simple overall construction which is achieved by simplifying the stacking structure for forming the cell assembly, and the gas duct defining structure for forming the intracellular passage gas ducts and intercellular passage gas ducts.

The above object is fulfilled, according to the present invention, by a fuel cell system in which the intracellular passages are open at one pair of opposite sides and closed at the other pair of opposite sides of each cell; the cell holders define notches for receiving the opposite sides where the intracellular passages are open, and bores opposed to the notches and extending in a stacking direction of the cells, respectively; the notches each include contact surfaces for tight contact with the closed sides adjacent opposite ends of each of the open sides, each of the notches having substantially the same depth as a thickness of one of the cells; the cell assembly is formed by the cells stacked with the open sides fitted into the notches of opposed pairs of the cell holders; and the bores define ducts extending in the stacking direction to act as intracellular passage gas ducts communicating with the intracellular passages.

According to the above construction, the cells are stacked with the open sides fitted into the notches of the cell holders. In the cell assembly thus formed, a plurality of cells are stacked with intercellular passages interposed between adjacent cells. That is, a space is secured between an adjacent pair of cells by thin blades left in the cell holders after formation of the notches and having a small material thickness. These thin blades close opposite sides of this space to define the intercellular passage between the adjacent cells.

The intracellular passages and intercellular passage are partitioned from each other by placing the thin blades and the pairs of contact surfaces of the cell holders holding the cell, and the reverse surfaces of adjacent cell holders, in tight contact with peripheries of the open end surfaces of the cell.

As noted above, the cells are stacked with the open sides fitted into the notches of the cell holders. In this state, the bores of the cell holders form ducts extending in the cell stacking direction. These ducts are used as intracellular passage gas ducts. Thus, while forming the cell assembly, it is possible to form two intracellular passage gas ducts, one of which is used as a supply duct and the other as an exhaust duct.

As a result, the plate-like cell holders are simply stacked to provide a simple structure. Even though the cell holders are arranged at the opposite open sides of the cells, only two cell holders are required for one cell. This feature results in a drastically reduced number of components, greatly simplifying the stacking structure for forming the cell assembly.

Moreover, this construction dispenses with the complicated gas passage defining members needed in the prior art to form intracellular passage gas ducts. That is, the invention involves a greatly simplified gas duct forming structure for forming intracellular passage gas ducts. The overall construction of this fuel cell system is much simpler than the conventional system.

The fuel cell system according to the present invention may further comprise partitions for defining intercellular passage gas ducts communicating with the intercellular passages, the partitions being mounted to cover two side surfaces of the cell assembly where the intercellular passages are open, and to bridge wall surfaces defined by end surfaces of the cell holders stacked at one side and wall surfaces defined by end surfaces of the cell holders stacked at the other side.

At the sides of the cell assembly having the closed end surfaces of the cells, the closed end surfaces of the cells are exposed to the ambient and the intercellular passages are open to the ambient. In the following description, the sides of the cell assembly having the closed end surfaces of the cells may be referred to as open sides.

According to the above construction, when the open sides of the cells are fitted in the notches of the cell holders, the end surfaces of cell holders are disposed outwardly of the open sides of the cells as seen in the cell stacking direction. Thus, wall surfaces are defined by the end surfaces of the cell holders, and are disposed outwardly of the open sides of the cell assembly as seen in the cell stacking direction.

A partition is disposed to cover one of the two open sides of the cell assembly and to bridge one of the wall surfaces defined by the end surfaces of the cell holders stacked at one side and one of the wall surfaces defined by the end surfaces of the cell holders stacked at the other side. The partition and the open side of the cell assembly define therebetween an intercellular passage gas duct communicating with the intercellular passages.

Such partitions may be provided for both of the open sides of the cell assembly to form two intercellular passage gas ducts, one of which is used as a supply duct and the other as an exhaust duct.

As a result, the intercellular passage gas ducts are formed by utilizing the wall surfaces defined by the end surfaces of the cell holders stacked. This feature enable use of very simple plate-like members as the partitions for defining the intercellular passage gas ducts. That is, the gas duct forming structure for forming the intercellular passage gas ducts are greatly simplified, compared with the complicated box-like gas duct forming structure used in the prior art. The overall construction of the fuel cell system is simplified by simplifying both the gas duct forming structure for forming the intracellular passage gas ducts and the gas duct forming structure for forming the intercellular passage gas ducts.

The fuel cell system according to the present invention may further comprise a box-shaped housing for enclosing the cell assembly; and a partition for defining an intercellular passage gas duct partitioned from an interior of the box-shaped housing and communicating with the intercellular passages, the partition being mounted to cover one of the side surfaces of the cell assembly where the intercellular passages are open, and to bridge a wall surface defined by end surfaces of the cell holders stacked at one side and a wall surface defined by end surfaces of the cell holders stacked at the other side.

According to this construction, a partition is provided for one of the open sides of the cell assembly to define one of the intercellular passage gas supply duct and exhaust duct. The open side of the cell assembly not having a partition is exposed to the interior of the box-shaped housing. Thus, the interior of the box-shaped housing is used as the other of the intercellular passage gas supply duct and exhaust duct.

The cell assembly is at a very high temperature during operation of the fuel cell system. It is therefore necessary to cover the cell assembly in a heat insulating condition such as by mounting the cell assembly in the box-shaped housing.

That is, the box-shaped housing used primarily for the heat insulating purpose is used also for forming either the intercellular passage gas supply duct or the intercellular passage gas exhaust duct.

As a result, the gas duct forming structure for forming the intercellular passage gas ducts are further simplified, to promote simplicity of the overall construction of the fuel cell system.

In the fuel cell system according to the present invention, grooves may be formed in the wall surfaces of the cell holders stacked at the opposite sides of the cells to extend over an entire length in the stacking direction, respectively, the partitions being connected to the wall surfaces with opposite edges thereof fitted in the grooves, and seals are filled into the grooves.

According to this construction, the seals filled into the grooves close gaps between the partitions and end surfaces.

This feature promotes reliability of the structure for sealing the intercellular passage gas ducts, thereby enhance durability of the fuel cell system.

In the fuel cell system according to the present invention, the partitions may include bent portions disposed at an end thereof in the stacking direction for closing openings at ends in the stacking direction of the intercellular passage gas ducts.

According to this construction, the openings at ends in the stacking direction of the intercellular passage gas ducts are closed by the bent portions of the partitions.

As a result, the gas duct forming structure for forming the intercellular passage gas ducts are further simplified, to promote simplicity of the overall construction of the fuel cell system.

Each partition may have an end thereof projecting in the stacking direction from the cell assembly, and the fuel cell system may further comprise a lid for closing openings of the intercellular passage gas ducts at ends thereof in the stacking direction, the lid defining slits for receiving the ends of the partitions projecting in the stacking direction, with seals fitted in the slits.

According to this construction, with the partitions and lid mounted in place, the ends of the partitions projecting in the stacking direction from the cell assembly are fitted into the slits of the lid. The seals are filled into the slits from outside the cell assembly to close gaps between the partitions and lid.

As a result, the gas duct forming structure for forming the intercellular passage gas ducts are further simplified, to promote simplicity of the overall construction of the fuel cell system.

The seals are formed of a material flexible in high temperature conditions during operation of the fuel cell system. Against an expansion and contraction of the partitions and lid occurring when operation of the fuel cell system is started and stopped, the seals allow relative movement between the partitions and lid while maintaining the sealed condition therebetween, thereby to protect the partitions and lid from stress.

This feature prevents a deterioration in the gastightness between the partitions and lid, and protects the partitions and lid from damage, thereby to promote durability of the fuel cell system The fuel cell system according to the present invention may further comprise a box-shaped housing for enclosing the cell assembly; and a pair of partitions one of which interconnects a wall surface defined by end surfaces of the cell holders stacked at one side, and inner surfaces of the box-shaped housing, the other partition interconnecting a wall surface defined by end surfaces of the cell holders stacked at the other side, and inner surfaces of the box-shaped housing, thereby dividing interior of the box-shaped housing into two parts used as intercellular passage gas ducts, respectively.

According to this construction, the pair of partitions divide the interior of the box-shaped housing into two parts. One of the two open sides of the cell assembly is opposed to one part of the housing interior. The other open side of the cell assembly is opposed to the other part of the housing interior. Thus, one part of the housing interior is used as an intercellular passage gas supply duct, while the other part is used as an intercellular passage gas exhaust duct.

Thus, the box-shaped housing used primarily for the heat insulating purpose is used also for forming either the intercellular passage gas supply duct or the intercellular passage gas exhaust duct.

As a result, the gas duct forming structure for forming the intercellular passage gas ducts are further simplified, to promote simplicity of the overall construction of the fuel cell system.

The cell holders stacked at one side may define connecting passages communicating with the intercellular passages and the bores, the duct defined by the bores of the cell holders having the connecting passages being used as a combination of the intracellular passage gas duct and intercellular passage gas duct.

According to this construction, the intercellular passages are open to the connecting passages formed in the cell holders stacked at one side. Thus, the intercellular passages are open at the opposite closed end surfaces and at the open end surfaces at one side of the cells, and closed at the open end surfaces at the other side of cells.

The two open sides (having the closed end surfaces of the cells) of the cell assembly are exposed to the interior of the box-shaped housing. Thus, the housing interior is used as the intercellular passage gas supply duct. The bores of the cell holders having the connecting passages form a gas duct extending in the cell stacking direction. This gas duct is used as a combination of the intracellular passage gas exhaust duct and intercellular passage gas exhaust duct. There is no need to provide a separate intercellular passage gas exhaust duct. The gas duct used as the combination of the intracellular passage gas exhaust duct and intercellular passage gas exhaust duct may hereinafter be referred to as a common gas duct.

As a result, the gas duct forming structure for forming the intercellular passage gas ducts are further simplified, to promote simplicity of the overall construction of the fuel cell system.

An intercellular passage gas is supplied through the openings of the intercellular passages at the opposite closed end surfaces of the cells. The intercellular passage gas is exhausted to the common gas duct through the openings at the open end surfaces of the cells, i.e. through the connecting passages defined by the cell holders. An intracellular passage gas also is exhausted to the common gas duct.

The intracellular passage gas and intercellular passage gas exhausted to the common gas duct are burned therein. The cell assembly is heated by the combustion heat.

Thus, in this fuel cell system, the cell assembly is heated by the combustion heat of the intracellular passage gas and intercellular passage gas exhausted to the common gas duct.

With this construction, the intracellular passage gas and intercellular passage gas exhausted are burned adjacent the cell assembly, to check radiation loss.

As a result, the fuel cell system has improved generating efficiency.

In the fuel cell system according to the present invention, at least one of the contact surfaces may be inclined to approach the other contact surface toward the open side as seen in a stacking direction of the cells, the open side defining an incline for tight contact with the inclined contact surface.

In order to partition the intracellular passages and intercellular passages, it is necessary to place the contact surfaces of the cell holders in tight contact with the opposite closed end surfaces of the cells.

According to the above construction, the cell holders are pressed to the open end surfaces of the cells placed in the notches of the cell holders. The inclined contact surface and the incline of the closed end surface of the cell absorb a difference between a space between a pair of contact surfaces and a space between a pair of closed end surfaces. This allows the contact surfaces of the cell holders to be in tight contact with the opposite closed end surfaces of the cells.

If the opposite contact surfaces were formed parallel to each other to fit with a pair of closed end surfaces of the cell, the space between the pair of contact surfaces must be determined with high precision to allow the contact surfaces to fit tight with the opposite closed end surfaces.

As a result, the manufacturing cost may be lowered in the absence of the necessity to form the cell holders with high precision.

In the fuel cell system according to the present invention, the intracellular passages may include oxygen-containing gas passage extensions extending to positions spaced from the end surfaces of the cells, so that the intracellular passages have outlets opening in positions spaced from the end surfaces, the intercellular passages may include fuel gas passage extensions extending to positions spaced from the end surfaces of the cells, so that the intercellular passages have outlets opening in positions spaced from the end surfaces.

According to this construction, the oxygen-containing gas exhausted from the outlets of the oxygen-containing gas passages and the fuel gas exhausted from the outlets of the fuel gas passages join each other in positions spaced from the end surfaces of the cells and burn therein.

This feature prevents an abnormal increase in the temperature of the cells, to promote durability of the cells.

The fuel cell system according to the present invention may be constructed as follows:

Each of the cells includes a passage-defining member opposed to the oxygen electrode for defining an intercellular passage therebetween; a plurality of such cells are stacked in a spaced relationship to form a cell assembly, with intercellular passages defined between adjacent cells; the cell holders (space forming elements) arranged between adjacent cells to maintain spaces therebetween project toward the gas exhaust duct; the fuel gas passage extensions are defined by penetrating portions extending through the cell holders from end surfaces opposed to the intercellular passages to end surfaces opposed to the gas exhaust duct; and the oxygen-containing gas passage extensions are formed between adjacent cell holders.

According to this construction, a fuel gas passage is formed between an adjacent pair of cells, i.e. between the fuel electrode of one cell and the passage-defining member of the other cell opposed to each other. The penetrating portions act as the fuel gas passage extensions. The oxygen-containing gas passage extensions are formed by portions of adjacent cell holders projecting from the end surfaces of the cells.

Thus, each cell includes only the passage-defining member for forming oxygen-containing gas passages. A plurality of such cells are stacked, with the cell holders maintaining spaces between adjacent cells. In this way, the fuel gas passages are formed in the cell assembly.

The cell holders are utilized to form the fuel gas passage extensions and oxygen-containing gas passage extensions.

As a result, the invention provides a simple cell structure and cell assembly, forming the intracellular passages along with formation of the cell assembly. Such a construction is utilized to form the fuel gas passage extensions and oxygen-containing gas passage extensions. With these features, the invention may be implemented at low cost.

The fuel cell system according to the present invention may comprise exhaust passage defining portions continuous with the portions of the cell holders projecting toward the gas exhaust duct, each exhaust passage defining portion having a thickness substantially corresponding to a sum of the space between adjacent cells and the thickness of each cell; the exhaust passage defining portions having bores extending in the cell stacking direction and communicating with outlets of the intercellular passages and intracellular passages; the bores forming a duct extending in the stacking direction to act as the gas exhaust duct.

According to this construction, when the cell assembly is formed by using the cell holders having the exhaust passage defining portions, a plurality of exhaust passage defining portions are stacked and the bores in the exhaust passage defining portions form a duct extending in the stacking direction. This duct acts as the gas exhaust duct.

As a result, the invention provides a simple cell structure and cell assembly, forming the intracellular passages along with formation of the cell assembly. This simplifies the overall construction of the fuel cell system, and assembly of the fuel cell system.

The cell holders may have grooves formed in surfaces thereof contacting the cells, the grooves being filled with seals.

According to this construction, gaps between the cells and cell holders may be closed with sufficient quantities of seals to assure reliable sealing therebetween. This feature effectively prevents the fuel gas from leaking into the intercellular passages through the gaps between the cells and cell holders.

As a result, combustion of the oxygen-containing gas and fuel gas due to leakage of the fuel gas is prevented from occurring adjacent the end surfaces of the cells. Thus, the cells have improved durability.

In the fuel cell system according to the present invention, the cells may have a rectangular shape, the oxygen-containing gas passage extensions and the fuel gas passage extensions being formed at one of the four end surfaces of each cell, inlets of the intracellular passages being formed at the end surface opposed to the end surface providing the oxygen-containing gas passage extensions and the fuel gas passage extensions, inlets of the intercellular passages being formed at opposite end surfaces adjacent the end surface providing the oxygen-containing gas passage extensions and the fuel gas passage extensions.

According to this construction, the cell assembly formed of the cells having a rectangular shape is in the form of a square column. This cell assembly has outlets of the intercellular passages and intracellular passages opening at one side thereof, and inlets of the intracellular passages at the opposite side. Inlets of the intercellular passages open at opposite sides adjacent the side having the outlets of the intercellular passages and intracellular passages.

An oxygen-containing gas supply duct may be provided for the side of the cell assembly having the inlets of the intracellular passages to supply an oxygen-containing gas to the intercellular passages. A fuel gas supply duct may be provided for the sides of the cell assembly having the inlets of the intercellular passages to supply a fuel gas to the intercellular passages. A gas exhaust duct may be provided for the side of the cell assembly having the outlets of the intercellular passages and intracellular passages to receive the oxygen-containing gas from the intracellular passages and the fuel gas exhausted from the intercellular passages.

As a result, the invention provides a simple construction for installing the oxygen-containing gas supply duct, fuel gas supply duct and gas exhaust duct. This simplifies the overall construction of the fuel cell system, and assembly of the fuel cell system.

The cell holders may include cutouts formed in end surfaces thereof opposed to the intracellular passage gas ducts, for forming the intracellular passage gas ducts.

According to this construction, the cell holders need not include bores for forming the intracellular passage gas ducts. This simplifies the construction of the cell holders themselves.

Each the intracellular passage gas ducts may be defined by a first wall member and a pair of second wall members, each of the second wall members including a stepped portion fitted into one of the cutouts.

According to this construction, the intracellular passage gas ducts are formed to communicate with the intracellular passages in the cell holders.

The cells may be stacked vertically.

According to this construction, a first pair of cell holders are placed on a base or the like, and the open ends of a cell are placed in the notches of the cell holders. Subsequently, next cell holders are stacked on the cell holders already in place, and the open ends of a next cell are placed in the notches of these cell holders. This sequence is repeated to form a cell assembly. This construction simplifies or dispenses with a device for supporting the cell holders and cells when forming the cell assembly.

This results in a reduced manufacturing cost.

The cells may be stacked horizontally.

According to this construction, the base is installed to have an upper surface extending horizontally. A cell assembly is formed by horizontally arranging the cells on the base, with the planes of the cells extending vertically, and with the open sides of the cells placed in the notches of the cell holders. That is, the upper surface of the base provides a reference plane for aligning the cells when the cells are arranged with the open sides thereof placed in the notches of the cell holders. This construction simplifies a device for aligning the cells in a straight stacking direction when forming the cell assembly.

This results in a reduced manufacturing cost.

Further and other objects, features and effects of the invention will become apparent from the following more detailed description of the embodiments of the invention taken with reference to the accompanying drawings.

DETAILED DESCRIPTION OF THE PREFERRED EMBODIMENTS

[First Embodiment]

A first embodiment of the present invention will be described with reference to FIGS. 1 through 5.

Figure 1:
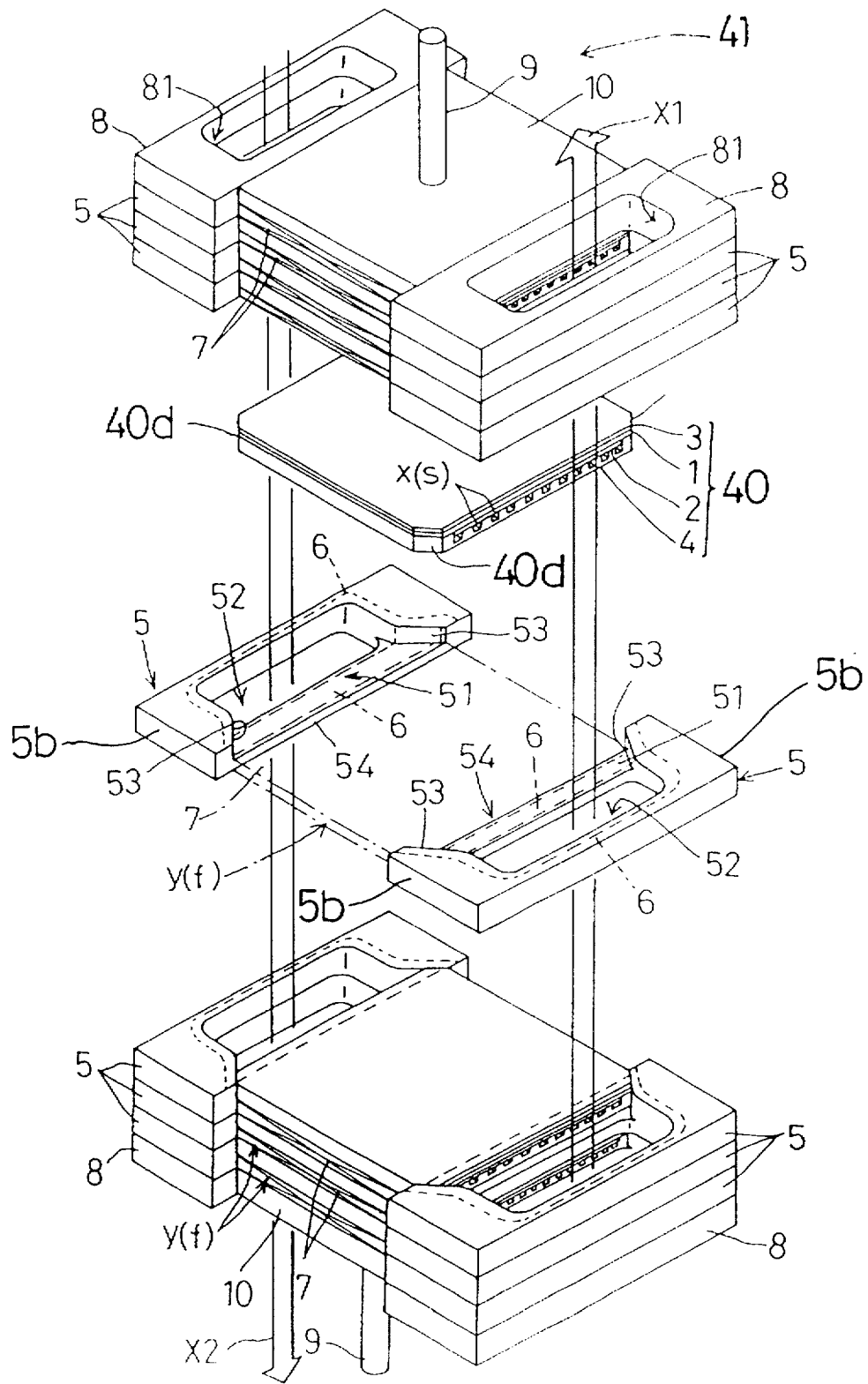
FIG. 1 is an exploded perspective view showing a stacking structure of a cell assembly in a first embodiment of the present invention.

As shown in FIG. 1, a fuel cell system includes cells 40 each in the form of a rectangular plate. Each cell 40 includes a solid-electrolyte layer 1 having an oxygen electrode 2 formed on one surface thereof and a fuel electrode 3 formed on the other surface, and a conductive separator 4 opposed to the oxygen electrode 2 to act as a passage defining element for defining intracellular passages "x". A plurality of such cells 40 are stacked in a spaced relationship to form a cell assembly 41, with intercellular passages "y" defined between adjacent cells 40.

The intracellular passages "x" extend between two opposite sides of each cell 40, the other opposite sides of each cell 40 being closed. In the following description, the sides of each cell 40 where the intracellular passages "x" are open are referred to as open sides 40a, end surfaces defining openings of the intracellular passages "x" are referred to as open end surfaces 40b, and end surfaces closing the intracellular passages "x" are referred to as closed end surfaces 40c.

The intercellular passages "y" are closed at the opposite open end surfaces 40b of cells 40, and open at the opposite closed end surfaces 40c thereof.

Figure 2:
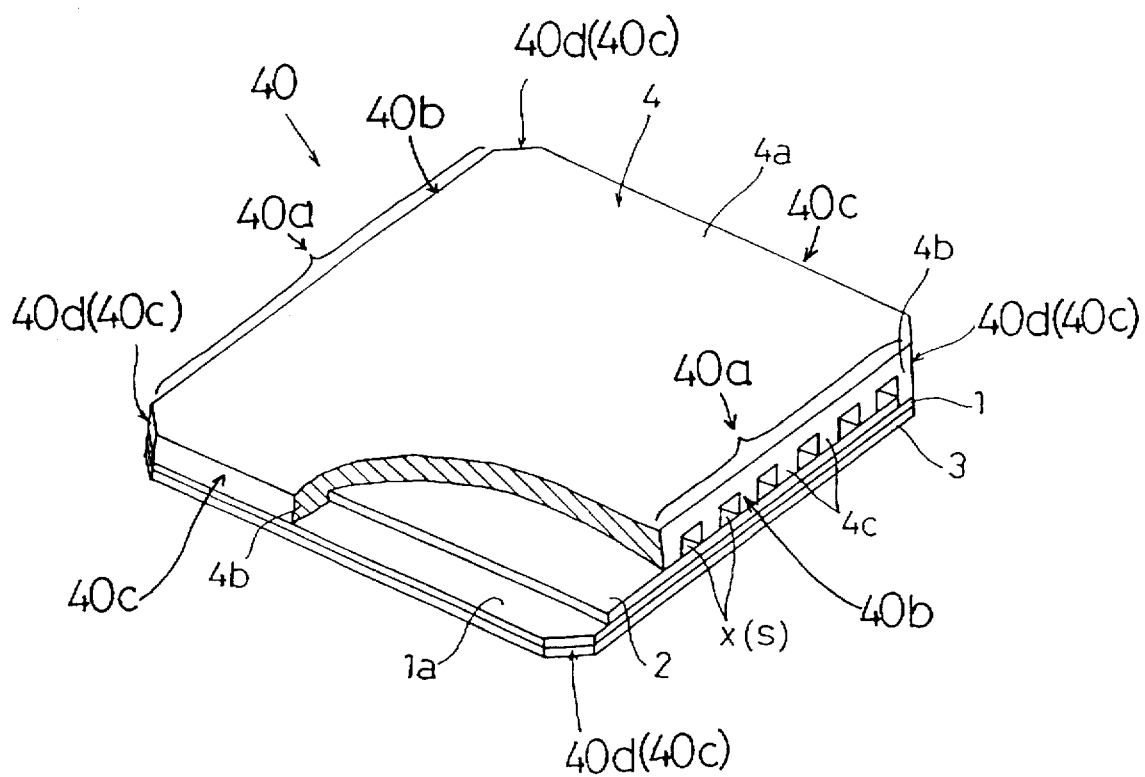
FIG. 2 is a perspective view, partly broken away, of a cell in the first embodiment.

The construction of each cell 40 will be described further with reference to FIG. 2.

The oxygen electrode 2 in the form of a layer or plate is applied to one surface of the solid-electrolyte layer 1 in the form of a rectangular plate. The electrolyte layer 1 includes an electrolyte exposing portion 1a extending along an entire length of each of two opposite parallel edges thereof. The fuel electrode 3 also in the form of a layer or plate is applied to the other surface of the electrolyte layer 1 to extend substantially over an entire area thereof. Thus, the cell 40 has a three-layer plate structure of rectangular shape, to derive an electromotive force from the oxygen electrode 2 and fuel electrode 3.

The solid-electrolyte layer 1, preferably, is formed of tetragonal zirconia which is a solid solution of ytterbia in about 3 mol %. The oxygen electrode 2, preferably, is formed of lanthanum-manganese oxide. The fuel electrode 3, preferably, is formed of a cermet of nickel and zirconia.

The separator 4 is formed of a conductive material, and includes, as integral parts thereof, a plate-like portion 4a, strip-shaped projections 4b extending along opposite edges of the plate-like portion 4a, and a plurality of ridges 4c arranged between the strip-shaped projections 4b. The conductive separator 4 is attached to the oxygen electrode 2, with the pair of strip-shaped projections 4b applied to the opposite electrolyte exposing portions 1a, and with the plurality of ridges 4c contacting the oxygen electrode 2. The above is the construction of each cell 40.

The oxygen electrode 2 and conductive separator 4 are connected to each other in conductive state, to define therebetween a plurality of intracellular passages "x" opening at two opposite end surfaces of the cell 40. Thus, the intracellular passages "x" are closed at the other opposite end surfaces of the cell 40. These intracellular passages "x" are opposed to the oxygen electrode 2, and act as oxygen-containing gas passages "s".

The four corners of conductive separator 4, solid-electrolyte layer 1 and fuel electrode 3 are cut off to define inclines. Thus, as described in detail later, each cell 40 defines inclines 40d at opposite ends of each closed end surface 40c thereof.

The conductive separator 4, preferably, is formed of lanthanum-chromium oxide which has excellent resistance to oxidation and reduction.

A stacking structure in which a plurality of cells 40 are stacked to form the cell assembly 41, with the intercellular passages "y" defined between adjacent cells 40, will be described next with reference to FIG. 1.

Numeral 5 in FIG. 1 denotes cell holders each in the form of a rectangular plate. Each cell holder 5 defines a notch 51 for receiving one of the open sides 40a of one cell 40, and a bore 52 opposed to the notch 51 and extending in a stacking direction of cells 40. The notch 51 has a pair of contact surfaces 53 for tight contact with the closed end surfaces 40c adjacent opposite ends of the open side 40a fitted into the notch 51. The notch 51 has a depth substantially corresponding to the thickness of cell 40.

The pair of contact surfaces 53 are inclined to approach each other toward the open side 40a of cell 40 as seen in the cell stacking direction. As noted hereinbefore, each cell 40 defines inclines 40d at the opposite ends of each closed end surfaces 40c thereof. These inclines 40d may be placed in tight contact with the inclined contact surfaces 53, respectively.

The cells 40 are stacked with the opposite open sides 40a fitted into the notches 51 of cell holders 5 arranged at opposite sides of the cells 40. Each cell holder 5 includes a thin blade 54 left after formation of the notch 51 and having a small material thickness. These thin blades 54 secure a space between an adjacent pair of cells 40, and close opposite sides of this space, to define intercellular passage "y" between the adjacent cells 40. Such intercellular passages "y" are closed at the opposite open end surfaces 40b of cells 40, and open at the opposite closed end surfaces 40c thereof. The intercellular passages "y" are opposed to the fuel electrodes 3 to act as fuel gas passages "f" for flowing a fuel gas containing hydrogen gas.

For fitting each open side 40a of cell 40 into the notch 51 of cell holder 5, the cell holder 5 is pressed against the open side 40a of cell 40. As a result, the contact surfaces 53 fit tight with the inclines 40d at the opposite ends of each closed end surface 40c of cell 40.

The intracellular passages "x" and intercellular passage "y" are partitioned from each other in gastight condition by placing the thin blades 54 and the pairs of contact surfaces 53 of the cell holders 5 holding the cell 40, and the reverse surfaces of adjacent cell holders 5, in tight contact with peripheries of the open end surfaces 40b defining the openings of intracellular passages "x" of that cell 40. As shown in broken lines in FIG. 1, heat resisting and electrically insulating seals 6 are mounted between the peripheries of the open end surfaces 40b and the thin blades 54 and contact surfaces 53 of the cell holders 5 holding the cell 40, and between the above peripheries and the reverse surfaces of adjacent cell holders 5, to assure the gastight condition.

As noted above, the cells 40 are stacked with the opposite open sides 40a fitted into the notches 51 of cell holders 5 arranged at opposite sides of the cells 40. In this state, the bores 52 of the cell holders 5 form two ducts extending in the cell stacking direction. One of the ducts is used as an intracellular passage gas supply duct X1 communicating with the intracellular passages "x". The other is used as an intracellular passage gas exhaust duct X2 communicating with the intracellular passages "x". As shown in broken lines in FIG. 1, seals 6 are mounted also between cell holders 5 arranged adjacent each other in the stacking direction, to secure gastightness of intracellular passage gas ducts X1 and X2 with respect to the ambient.

Each intercellular passage "y" between adjacent cells 40 is filled with a flexible conductive material 7 which allows gas flows therethrough, to interconnect the cells 40 in conductive state.

The flexible conductive material 7, preferably, comprises a felt-like nickel material which has excellent resistance to heat and reduction. The cell holders 5 are formed of a ceramic material which is electrically insulative and has excellent resistance to heat.

As noted above, the cells 40 are stacked with the opposite open sides 40a fitted into the notches 51 of cell holders 5 arranged at opposite sides of the cells 40. This stacking structure includes a pair of collecting plate holders 8 arranged at each of opposite ends in the stacking direction thereof. Each collecting plate holder 8 defines only a bore 81 corresponding in shape to the bores 52 of cell holders 5 as seen in the cell stacking direction, and includes nothing corresponding to the notches 51 of cell holders 5.

The collecting plate holders 8 at each end support a collecting plate 10 placed in contact with flexible conductive material 7 and having a terminal rod 9 fixed to the collecting plate 10. Output power is taken out through the opposite terminal rods 9.

The above is the construction of cell assembly 41.

Figure 3:
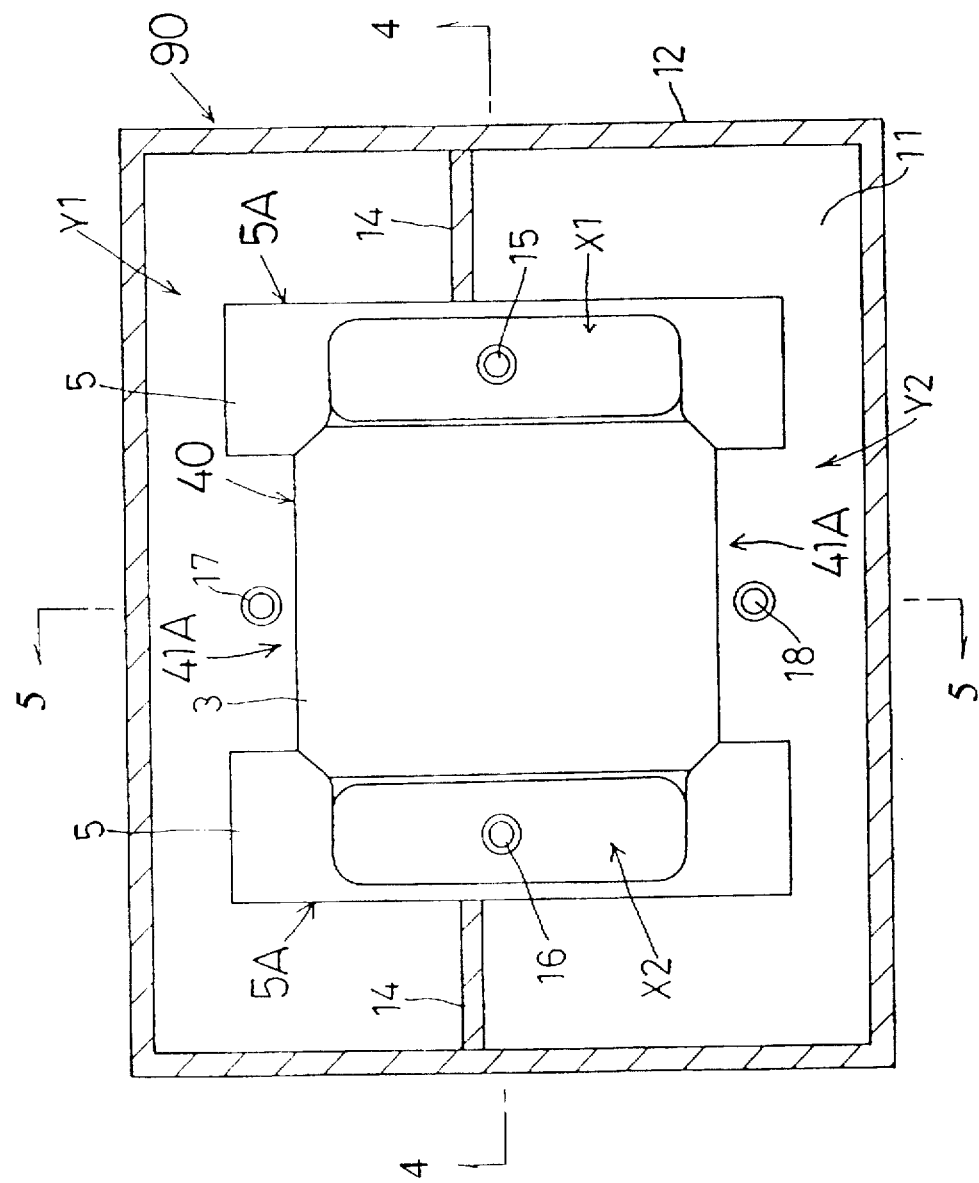
FIG. 3 is a sectional plan view of a fuel cell system in the first embodiment.
Figure 4:
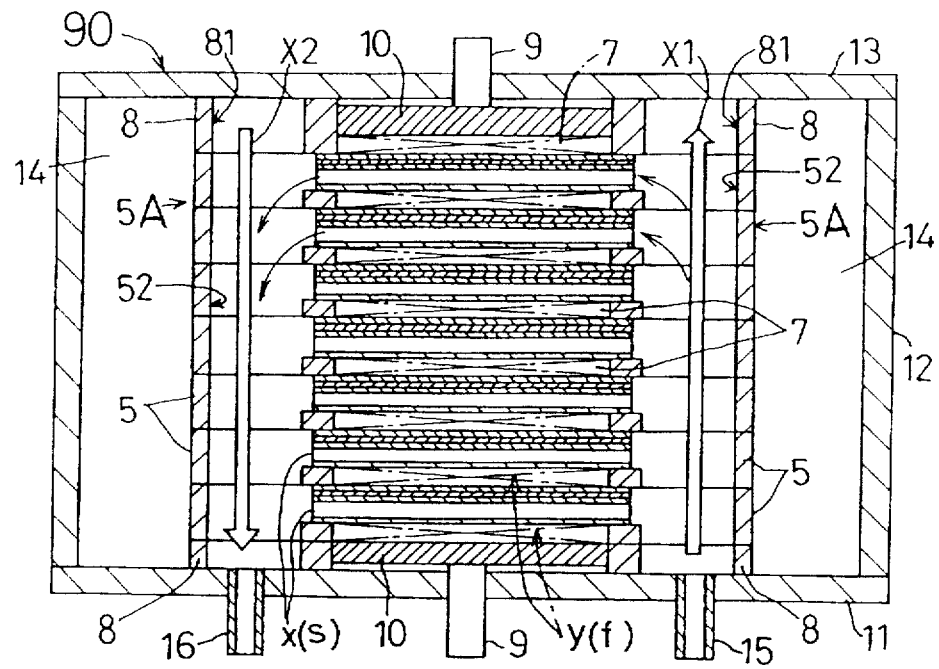
FIG. 4 is a section taken on line 4—4 of FIG. 3.
Figure 5:
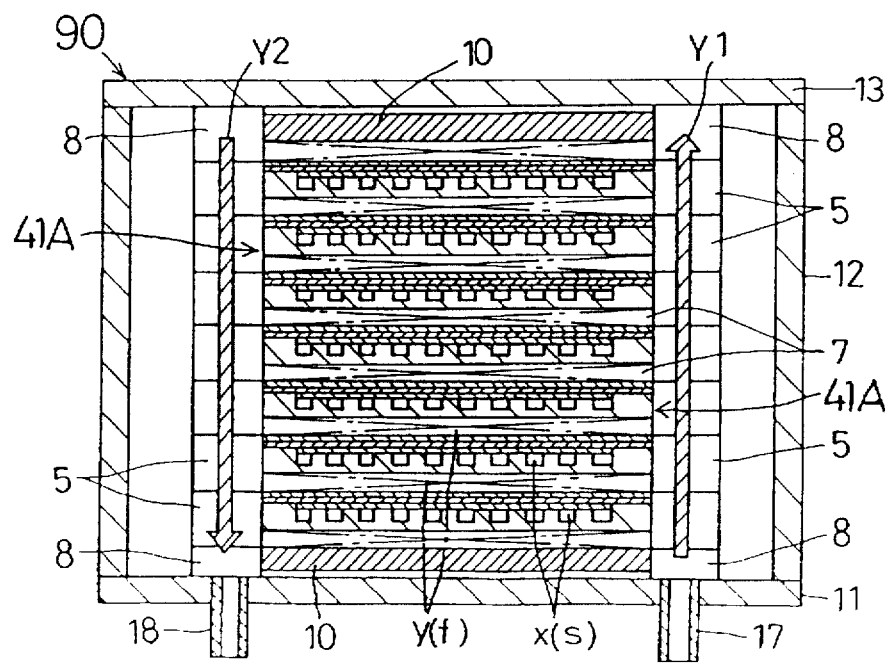
FIG. 5 is a section taken on line 5—5 of FIG. 3.

Next, an overall construction of the fuel cell system will be described with reference to FIGS. 3 through 5.

The cell assembly 41 described above is mounted on a base 11, and is surrounded by a square enclosure 12 also mounted on the base 11. The base 11 closes a lower opening of the square enclosure 12, and lower openings of the intracellular passage gas supply duct X1 and exhaust duct X2.

An upper opening of the square enclosure 12 and upper openings of the intracellular passage gas supply duct X1 and exhaust duct X2 are closed by a lid 13.

Thus, the base 11, square enclosure 12 and lid 13 constitute a box-shaped housing 90 for enclosing the cell assembly 41. The sides of the cell assembly 41 having the closed end surfaces 40c of cells 40 (hereinafter referred to as open sides 41A) are opposed to interior regions of the box-shaped housing 90. In other words, the closed end surfaces 40c are opposed to interior regions of the box-shaped housing 90, and the intercellular passages "y" are open to the interior regions of the box-shaped housing 90.

One of the terminal rods 9 extends through the lid 13 in gas tight condition, to project from the box-shaped housing 90. The other terminal rod 9 extends through the base 11 in gas tight condition, to project from the box-shaped housing 90.

One partition 14 is mounted to interconnect a wall surface 5A defined by end surfaces of cell holders 5 stacked at one side, and inner surfaces of the box-shaped housing 90, i.e. an inner surface of the base 11, an inner surface of the square enclosure 12 and an inner surface of the lid 13. Another partition 14 is mounted to interconnect a wall surface 5A defined by end surfaces of cell holders 5 stacked at the other side, and inner surfaces of the box-shaped housing 90, i.e. an inner surface of the base 11, an inner surface of the square enclosure 12 and an inner surface of the lid 13. Thus, these partitions 14 divide the interior of the box-shaped housing 90 into two parts. One of the two open sides 41A of the cell assembly 41 is opposed to one part of the interior of the box-shaped housing 90. The other open side 40A of the cell assembly 41 is opposed to the other part of the interior of the box-shaped housing 90. One part of the interior is used as an intercellular passage gas supply duct Y1, and the other part as an intercellular passage gas exhaust duct Y2.

An intracellular passage gas supply pipe 15 is connected to the intracellular passage gas supply duct X1. An intracellular passage gas exhaust pipe 16 is connected to the intracellular passage gas exhaust duct X2. An intercellular passage gas supply pipe 17 is connected to the intercellular passage gas supply duct Y1. An intercellular passage gas exhaust pipe 18 is connected to the intercellular passage gas exhaust duct Y2.

[Second Embodiment]

Figure 6:
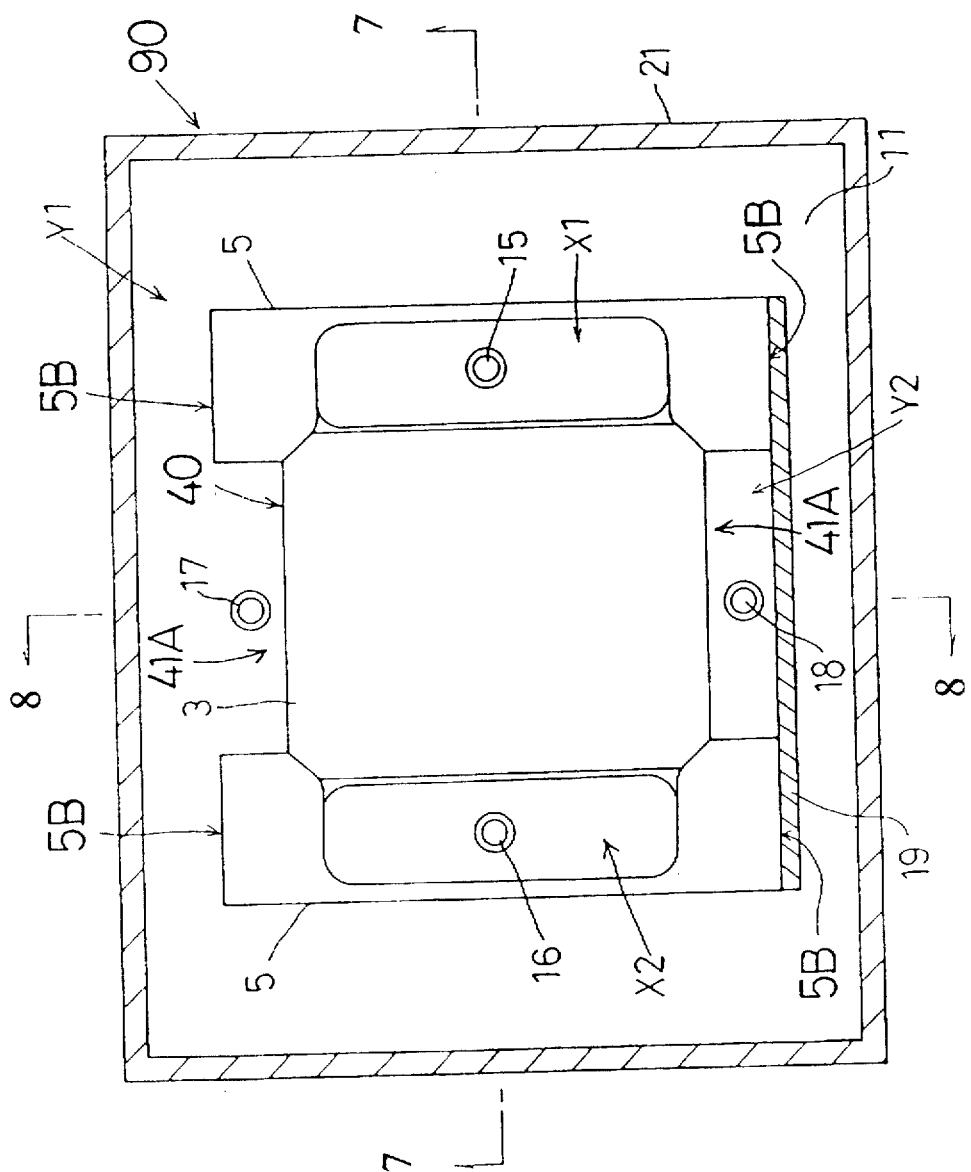
FIG. 6 is a sectional plan view of a fuel cell system in a second embodiment of the invention.
Figure 7:
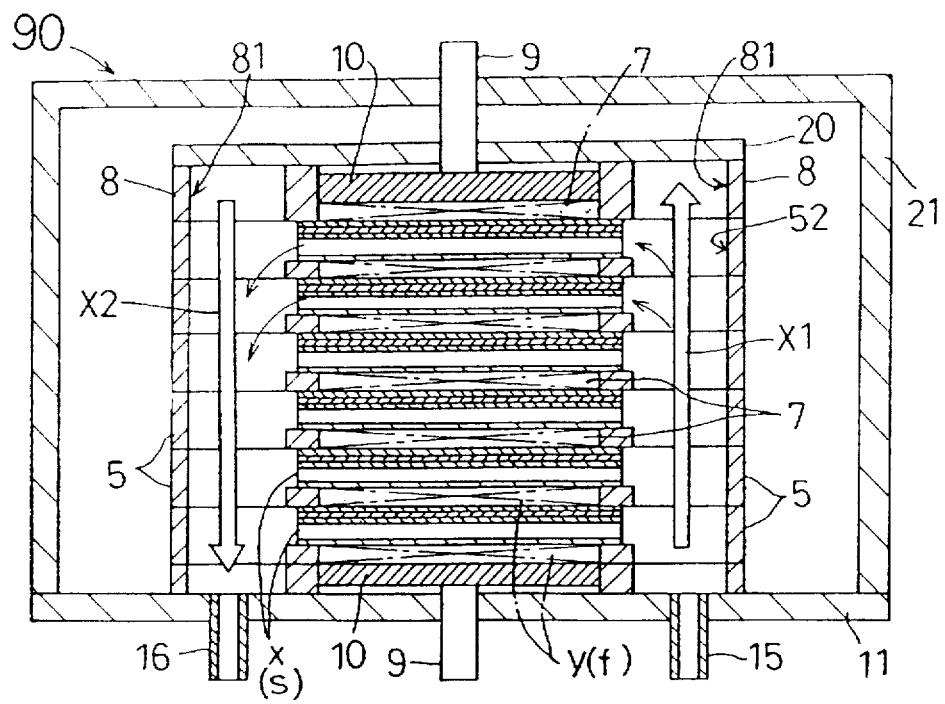
FIG. 7 is a section taken on line 7—7 of FIG. 6.
Figure 8:
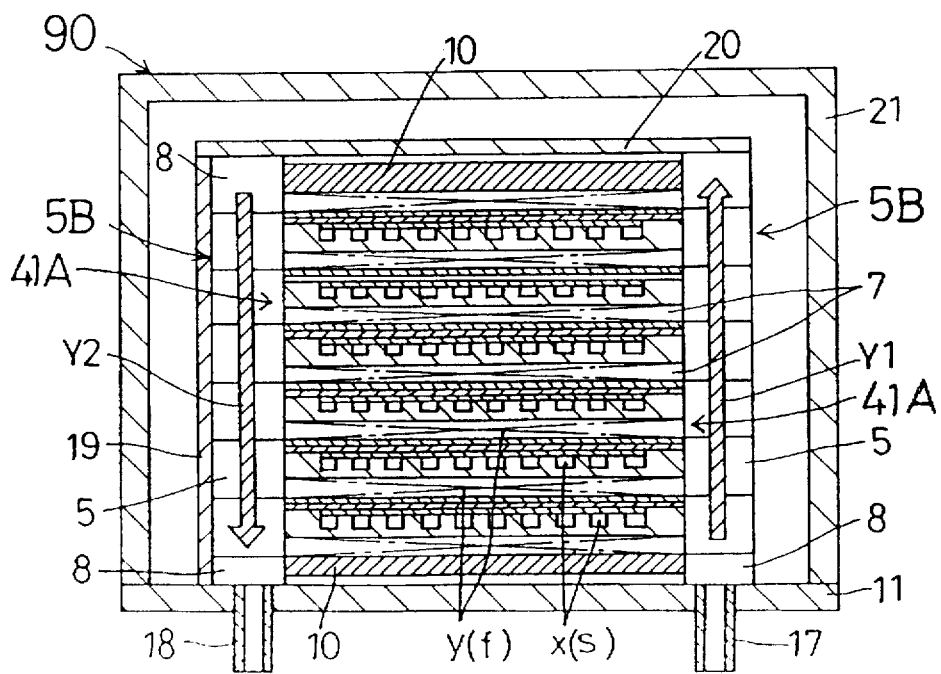
FIG. 8 is a section taken on line 8—8 of FIG. 6.

A second embodiment will be described with reference to FIGS. 6 through 8.

The cells 40 and cell assembly 41 are the same as in the first embodiment, and will not be described again.

An overall construction of the fuel cell system will be described hereinafter.

With the open sides 40a of cells 40 fitted in the notches 51 of cell holders 5, end surfaces 5b of cell holders 5 are disposed outwardly of the open sides 40a of cells 40 as seen in the cell stacking direction. Thus, wall surfaces 5B defined by the end surfaces 5b of cell holders 5 are disposed outwardly of the open sides 41A of the cell assembly 41 as seen in the cell stacking direction.

A partition 19 is disposed to cover one of the two open sides 41A of the cell assembly 41 and to bridge one of the wall surfaces 5B defined by the end surfaces of the cell holders 5 stacked at one side and one of the wall surfaces 5B defined by the end surfaces of the cell holders 5 stacked at the other side. The partition 19 and the open side 41A of the cell assembly 41 define therebetween an intercellular passage gas exhaust duct Y2 communicating with the intercellular passages "y".

The cell assembly 41 having the above partition 19 is mounted on the base 11. An upper opening of the intercellular passage gas exhaust duct Y2, and upper openings of the intracellular passage gas supply duct X1 and exhaust duct X2, are closed by a lid 20.

A bottomed square enclosure 21 is mounted on the base 11, with an opening of the enclosure 21 facing downward. The base 11 closes the opening of the bottomed square enclosure 21, a lower opening of the intercellular passage gas exhaust duct Y2, and lower openings of the intracellular passage gas supply duct X1 and exhaust duct X2.

Thus, the base 11 and bottomed square enclosure 21 constitute a box-shaped housing 90 for enclosing the cell assembly 41.

One of the terminal rods 9 extends through the lid 20 and the bottom of bottomed square enclosure 21 in gas tight condition, to project from the box-shaped housing 90. The other terminal rod 9 extends through the base 11 in gas tight condition, to project from the box-shaped housing 90.

The open side 41A of the cell assembly 41 not having the partition 19 is opposed to an interior region of the box-shaped housing 90. Thus, the interior of box-shaped housing 90 is used as an intercellular passage gas supply duct Y1.

An intracellular passage gas supply pipe 15 is connected to the intracellular passage gas supply duct X1. An intracellular passage gas exhaust pipe 16 is connected to the intracellular passage gas exhaust duct X2. An intercellular passage gas supply pipe 17 is connected to the intercellular passage gas supply duct Y1. An intercellular passage gas exhaust pipe 18 is connected to the intercellular passage gas exhaust duct Y2.

[Third Embodiment]

Figure 10:
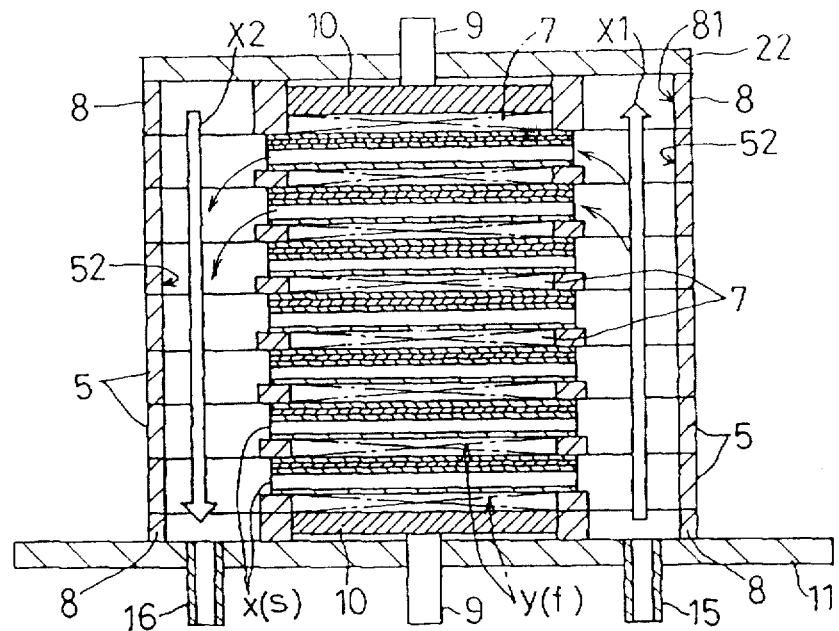
FIG. 10 is a section taken on line 10—10 of FIG. 9.
Figure 11:
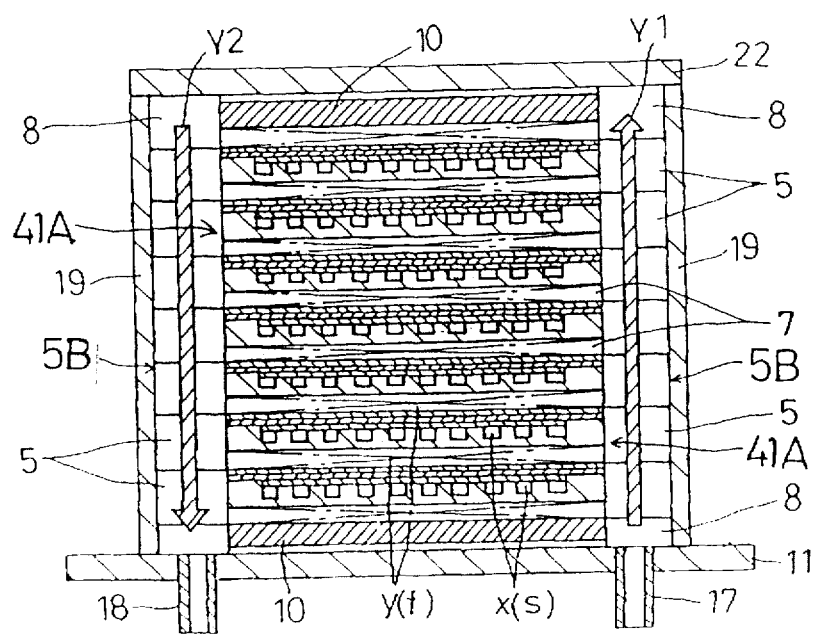
FIG. 11 is a section taken on line 11—11 of FIG. 9.

A third embodiment will be described with reference to FIGS. 9 through 11.

The cells 40 and cell assembly 41 are the same as in the first embodiment, and will not be described again.

An overall construction of the fuel cell system will be described hereinafter.

Partitions 19 are disposed to cover the two open sides 41A of the cell assembly 41, as in the second embodiment, to define an intercellular passage gas supply duct Y1 and an intercellular passage gas exhaust duct Y2.

The cell assembly 41 having the two partitions 19 is mounted on the base 11. The base 11 covers lower openings of the intercellular passage gas supply duct Y1 and exhaust duct Y2, and lower openings of the intracellular passage gas supply duct X1 and exhaust duct X2.

A lid 22 covers upper openings of the intercellular passage gas supply duct Y1 and exhaust duct Y2, and upper openings of the intracellular passage gas supply duct X1 and exhaust duct X2.

One of the terminal rods 9 extends through the lid 22, while the other terminal rod 9 extends through the base 11 in gas tight condition.

The open side 41A of the cell assembly 41 not having the partition 19 is opposed to an interior region of the box-shaped housing 90. Thus, the interior of box-shaped housing 90 is used as an intercellular passage gas supply duct Y1.

An intracellular passage gas supply pipe 15 is connected to the intracellular passage gas supply duct X1. An intracellular passage gas exhaust pipe 16 is connected to the intracellular passage gas exhaust duct X2. An intercellular passage gas supply pipe 17 is connected to the intercellular passage gas supply duct Y1. An intercellular passage gas exhaust pipe 18 is connected to the intercellular passage gas exhaust duct Y2.

[Fourth Embodiment]

A fourth embodiment will be described with reference to FIGS. 12 through 15.

The cells 40 are the same as in the first embodiment, and will not be described again.

Figure 12:
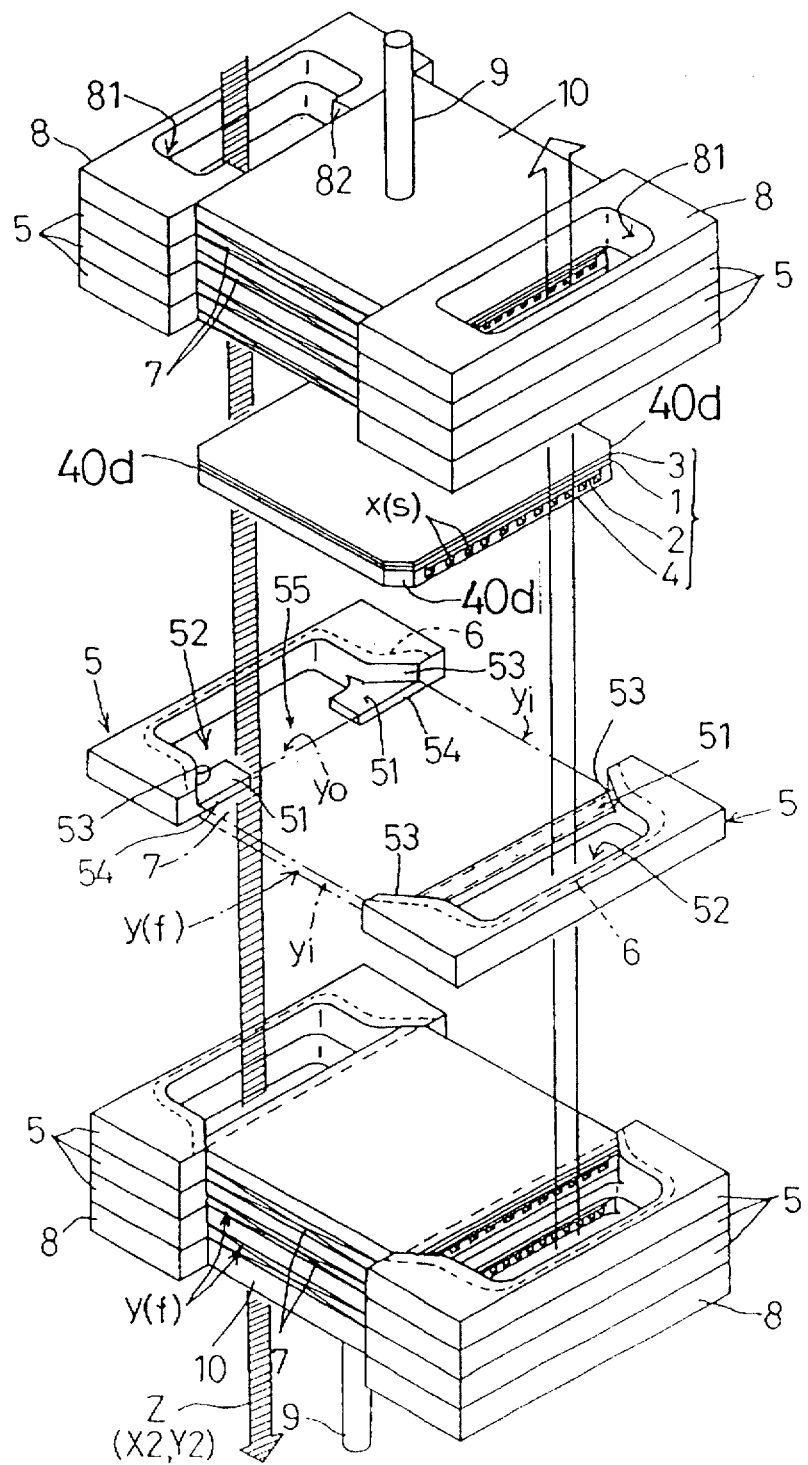
FIG. 12 is an exploded perspective view showing a stacking structure of a cell assembly in a fourth embodiment of the invention.

A stacking structure in which a plurality of cells 40 are stacked to form the cell assembly 41, with the intercellular passages "y" defined between adjacent cells 40, will be described next with reference to FIG. 12.

As in the first embodiment, the cells 40 are stacked with the opposite open sides 40a fitted into the notches 51 of cell holders 5 arranged at opposite sides of the cells 40. This embodiment differs from the first embodiment in the following respect.

Each of the cell holders 5 stacked at one side includes a connecting passage 55 for intercommunicating the bore 52 and intercellular passage "y". The connecting passage 55 is defined by forming a gap in an intermediate position of the thin blade 5 of cell holder 5. Each of the collecting plate holders 8 stacked with the cell holders 5 having the connecting passages 55 includes a connecting passage 82 for intercommunicating the intercellular passages "y" and bore 81.

The cell holders 5 having the connecting passages 55 have seals 6 mounted only between the cell holders 5 adjacent each other in the stacking direction.

The intercellular passages "y" are open to the connecting passages 55 formed in the cell holders 5 stacked at the one side. Thus, the intercellular passages "y" are open at the opposite closed end surfaces 40c and at the open end surfaces 40b at one side of cells 40, and closed at the open end surfaces 40b at the other side of cells 40. In the following description, openings of the intercellular passages "y" at the closed end surfaces 40c of cells 40 will be referred to as openings "yi", and openings thereof at the open end surfaces 40b at one side of cells 40 will be referred to as openings "yo".

The bores 52 of the cell holders 5 having the connecting passages 55 form a common gas duct Z extending in the cell stacking direction. This common gas duct Z is used as a combination of the intracellular passage gas exhaust duct X2 and intercellular passage gas exhaust duct Y2.

The above is the stacking structure forming the cell assembly 41 in the fourth embodiment as distinct from the first embodiment.

Figure 13:
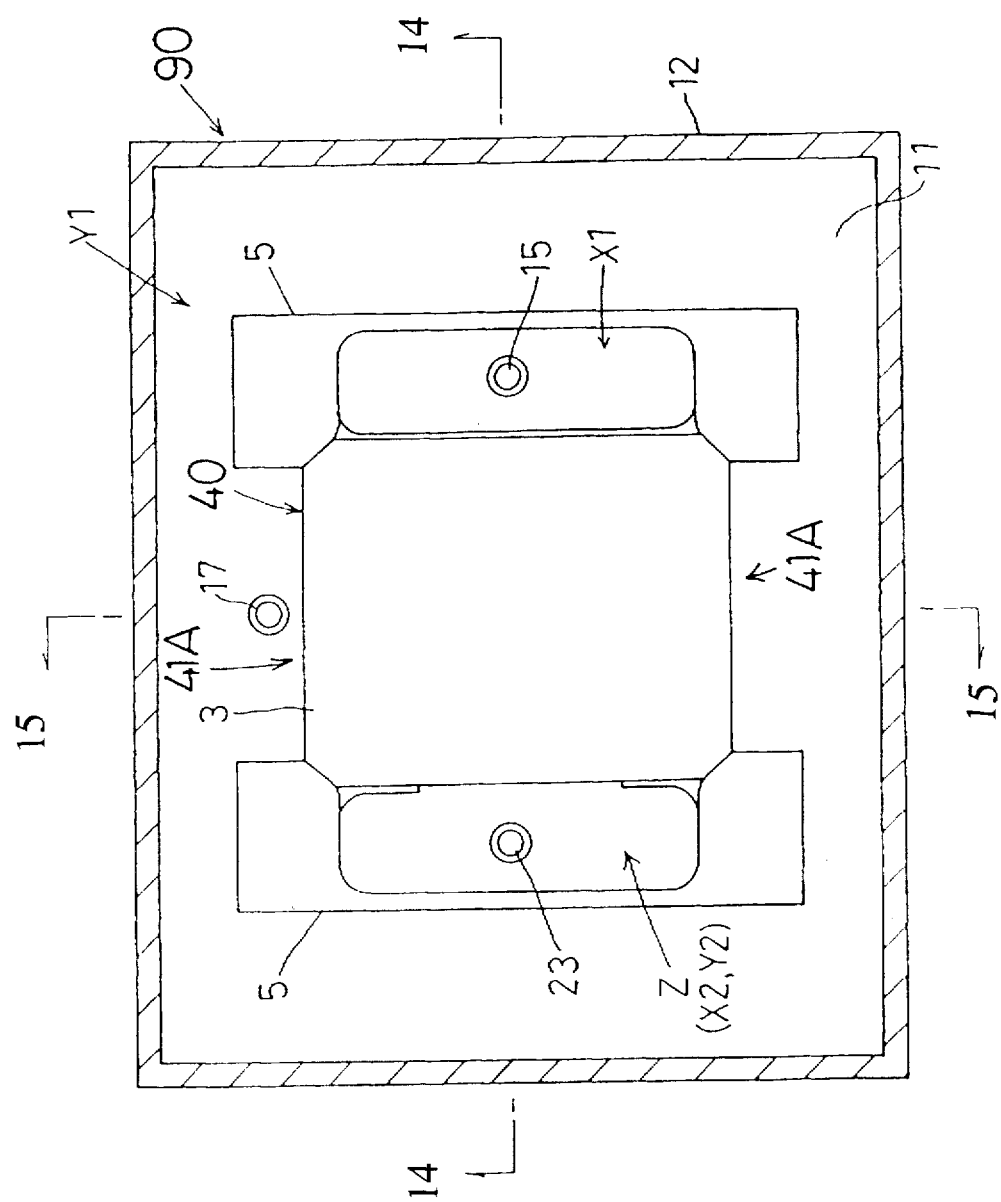
FIG. 13 is a sectional plan view of a fuel cell system in the fourth embodiment.
Figure 14:
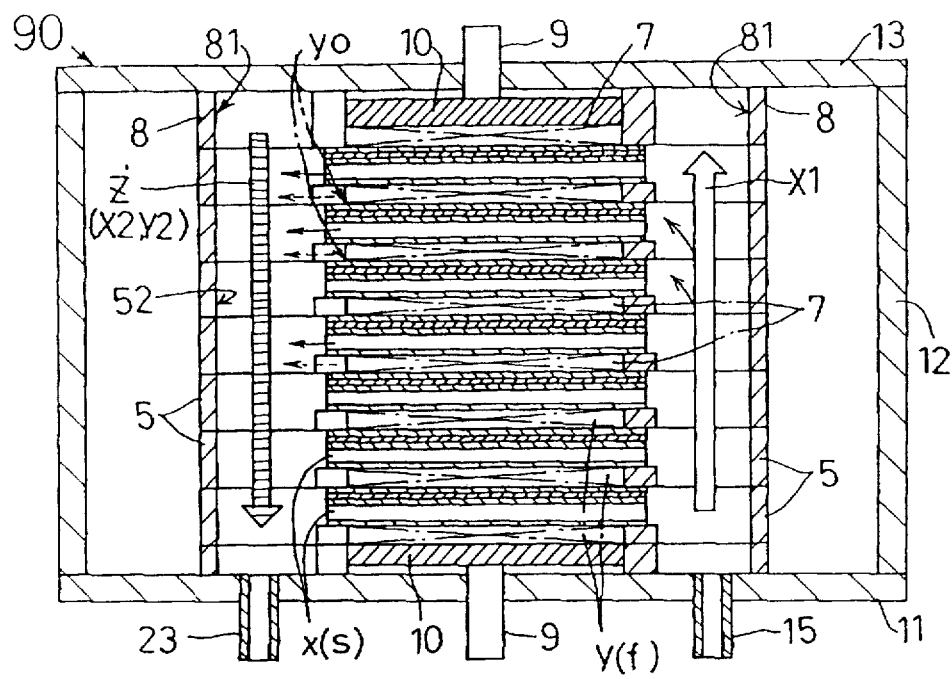
FIG. 14 is a section taken on line 14—14 of FIG. 13.
Figure 15:
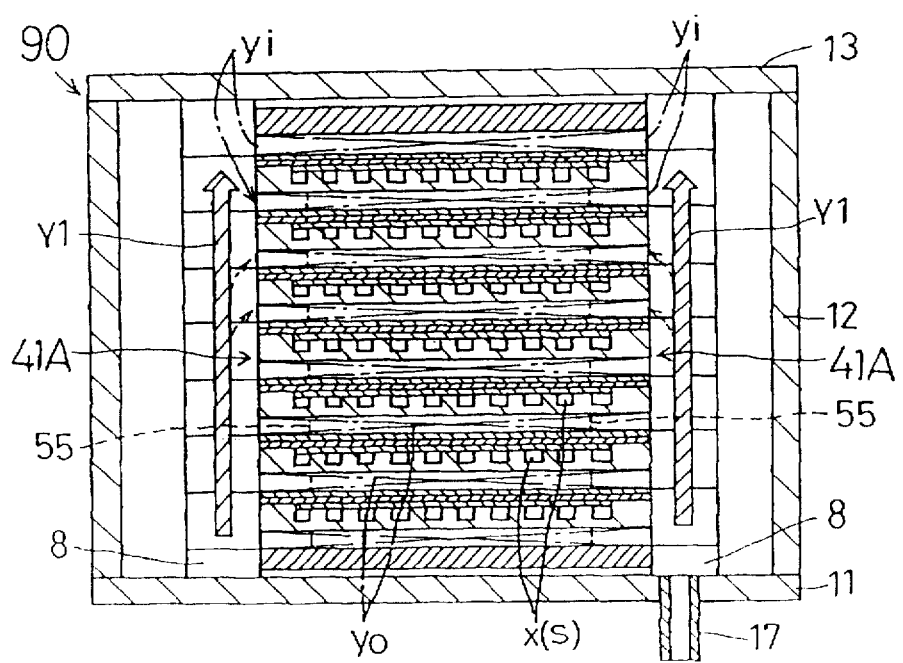
FIG. 15 is a section taken on line 15—15 of FIG. 13.

Next, an overall construction of the fuel cell system will be described with reference to FIGS. 13 through 15.

The cell assembly 41 having the above structure is mounted on the base 11, and is surrounded by a square enclosure 12 also mounted on the base 11. The base 11 closes a lower opening of the square enclosure 12, and lower openings of the intracellular passage gas supply duct X1 and common gas duct Z.

An upper opening of the square enclosure 12 and upper openings of the intracellular passage gas supply duct X1 and common gas duct Z are closed by a lid 13.

Thus, the base 11, square enclosure 12 and lid 13 constitute a box-shaped housing 90 for enclosing the cell assembly 41.

One of the terminal rods 9 extends through the lid 13 in gas tight condition, to project from the box-shaped housing 90. The other terminal rod 9 extends through the base 11 in gas tight condition, to project from the box-shaped housing 90.

The two open sides 41A of the cell assembly 41 (where the closed end surfaces 40c of cells 40 are arranged) are opposed to the interior of the box-shaped housing 90. Thus, the openings "yi" of the intercellular passages "y" at the two closed end surfaces 40c are opposed to the interior of the box-shaped housing 90. The interior of the box-shaped housing 90 is therefore used as intercellular passage gas supply duct Y1.

The fuel gas is supplied to the intercellular passages "y" through the intercellular passage gas supply duct Y1 and the openings "yi" at the two closed end surfaces 40c. After flowing through the intercellular passages "y", the fuel gas is exhausted to the common gas duct Z through the openings "yo" at the open end surfaces, i.e. through the connecting passages 55 formed in the cell holders 5. On the other hand, the oxygen-containing gas is supplied to the intracellular passages "x" through the intracellular passage gas supply duct X1. After flowing through the intracellular passages "x", the oxygen-containing gas is exhausted to the common gas duct Z.

The oxygen-containing gas and fuel gas exhausted to the common gas duct Z undergo combustion therein. The heat of combustion is used to heat the cell assembly 41.

An intracellular passage gas supply pipe 15 is connected to the intracellular passage gas supply duct X1. An intercellular passage gas supply pipe 17 is connected to the intercellular passage gas supply duct Y1. A combustion gas exhaust pipe 23 is connected to the common gas duct Z.

[Fifth Embodiment]

A fifth embodiment will be described with reference to FIGS. 16 through 19.

The cells 40 are the same as in the first embodiment, and will not be described again.

Figure 16:
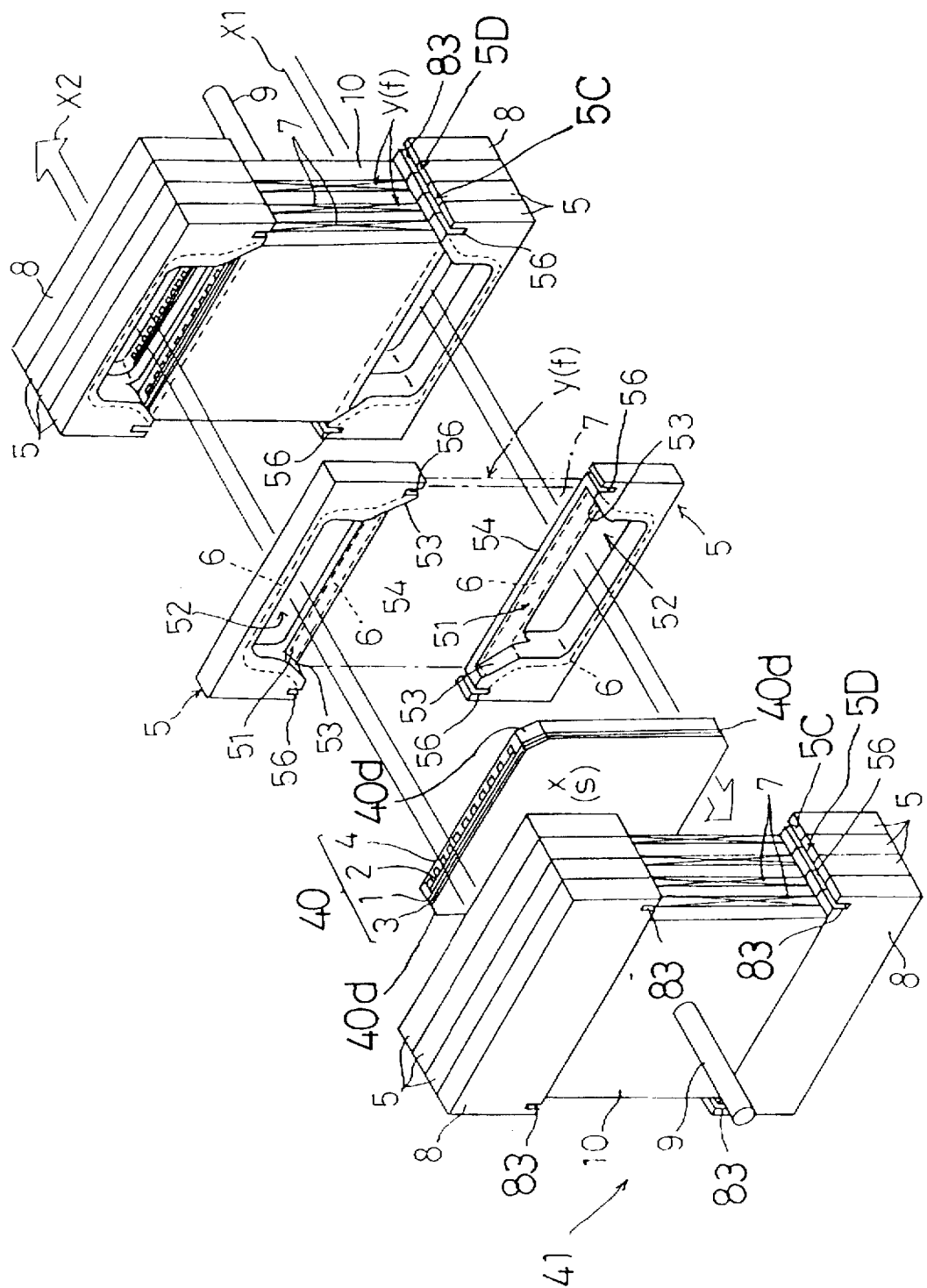
FIG. 16 is an exploded perspective view showing a stacking structure of a cell assembly in a fifth embodiment of the invention.

A stacking structure in which a plurality of cells 40 are stacked to form the cell assembly 41, with the intercellular passages "y" defined between adjacent cells 40, will be described next with reference to FIG. 16.

The cell holders 5 have the same construction as in the first embodiment, except that each cell holder 5 here defines a pair of cutouts 56.

The cutouts 56 are formed in end surfaces of the cell holders 5 to be in alignment with one another in the direction in which the cell holders 5 are stacked.

A base (not shown) of the cell assembly is placed with an upper surface thereof extending horizontally. The cells 40, with the opposite open sides 40a fitted into the notches 51 of cell holders 5 arranged at opposite sides of the cells 40, are stacked horizontally and placed on the base to have the planes of the cells 40 extending vertically. The thin blades 54 of cell holders 5 secure a space between an adjacent pair of cells 40, and close opposite sides of this space, to define intercellular passage "y" between the adjacent cells 40. The intercellular passages "y" are closed at the opposite open end surfaces 40b of cells 40, and open at the opposite closed end surfaces 40c thereof. The intercellular passages "y" are opposed to the fuel electrodes 3 to act as fuel gas passages "f" for flowing a fuel gas containing hydrogen gas.

For fitting each open side 40a of cell 40 into the notch 51 of cell holder 5, the cell holder 5 is pressed against the open side 40a of cell 40. As a result, the contact surfaces 53 fit tight with the inclines 40d at the opposite ends of each closed end surface 40c of cell 40.

The intracellular passages "x" and intercellular passage "y" are partitioned from each other in gastight condition by placing the thin blades 54 and the pairs of contact surfaces 53 of the cell holders 5 holding the cell 40, and the reverse surfaces of adjacent cell holders 5, in tight contact with peripheries of the open end surfaces 40b defining the openings of intracellular passages "x" of that cell 40. As shown in broken lines in FIG. 16, heat resisting and electrically insulating seals 6 are mounted between the peripheries of the open end surfaces 40b and the thin blades 54 and contact surfaces 53 of the cell holders 5 holding the cell 40, and between the above peripheries and the reverse surfaces of adjacent cell holders 5, to assure the gastight condition.

As noted above, the cells 40 are stacked with the opposite open sides 40a fitted into the notches 51 of cell holders 5 arranged at opposite sides of the cells 40. In this state, the bores 52 of the cell holders 5 form two ducts extending in the cell stacking direction. One of the ducts is used as an intracellular passage gas supply duct X1 communicating with the intracellular passages "x". The other is used as an intracellular passage gas exhaust duct X2 communicating with the intracellular passages "x". As shown in broken lines in FIG. 16, seals 6 are mounted also between cell holders 5 arranged adjacent each other in the stacking direction, to secure gastightness of intracellular passage gas ducts X1 and X2 with respect to the ambient.

Each intercellular passage "y" between adjacent cells 40 is filled with a flexible conductive material 7 which allows gas flows therethrough, to interconnect the cells 40 in conductive state.

Figure 18:
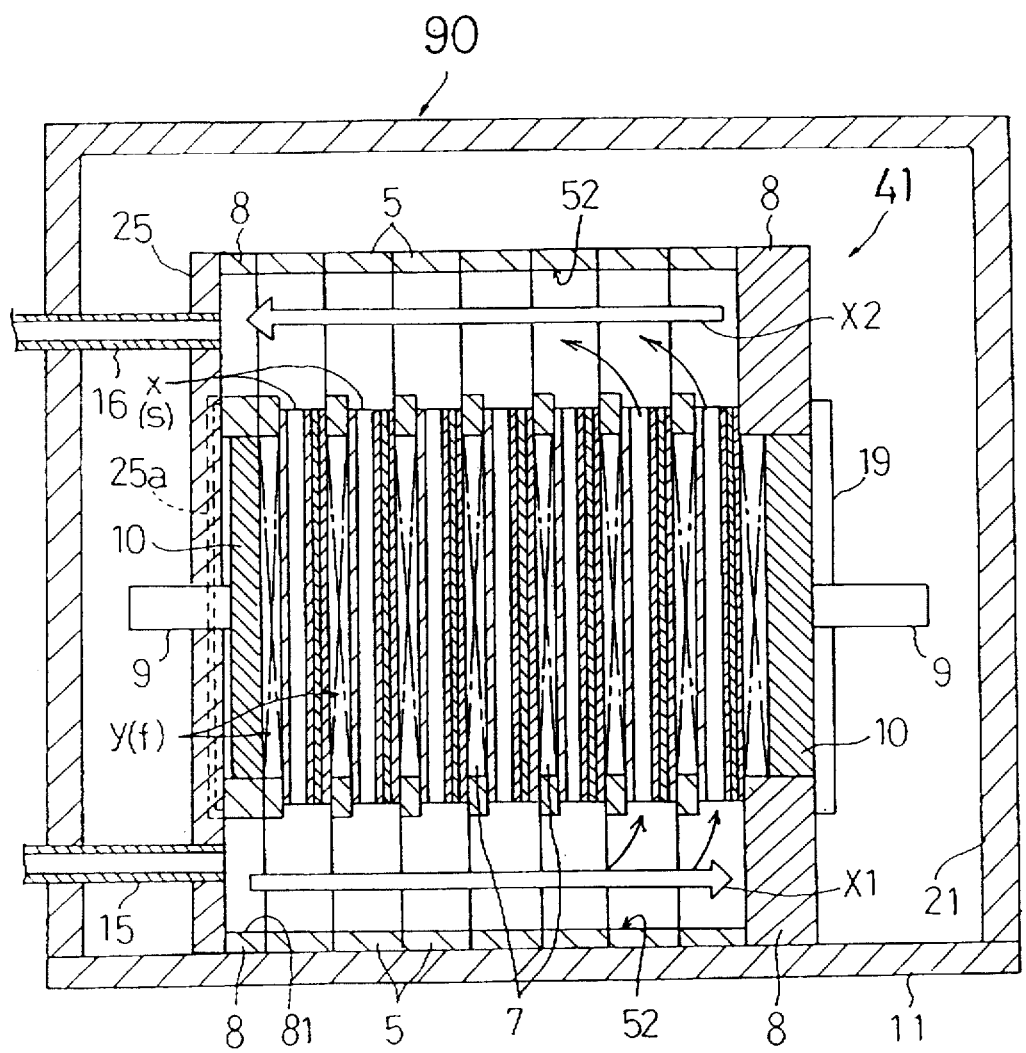
FIG. 18 is a section taken on line 18—18 of FIG. 17.

As noted above, the cells 40 are stacked with the opposite open sides 40a fitted into the notches 51 of cell holders 5 arranged at opposite sides of the cells 40. This stacking structure includes a pair of collecting plate holders 8 arranged at each of opposite ends in the stacking direction thereof. Each collecting plate holder 8 defines cutouts 83 corresponding in shape to the cutouts 56 of cell holders 5, but includes nothing corresponding to the notches 51 of cell holders 5. As also shown in FIG. 18, each of the collecting plate holders 8 arranged at the end of the stacking structure opposed to the separators 4 of cells 40 defines a bore 81.

A wall surface 5C defined by end surfaces of the cell holders 5 and collecting plate holders 8 stacked at one side, and a wall surface 5C defined by end surfaces of the cell holders 5 and collecting plate holders 8 stacked at the other side, include grooves 5D extending over an entire length in the cell stacking direction, respectively. These grooves 5D are formed by the cutouts 56 of cell holders 5 and the cutouts 83 of collecting plate holders 8.

The collecting plate holders 8 at each end support a collecting plate 10 placed in contact with flexible conductive material 7 and having a terminal rod 9 fixed to the collecting plate 10. Output power is taken out through the opposite terminal rods 9.

Figure 17:
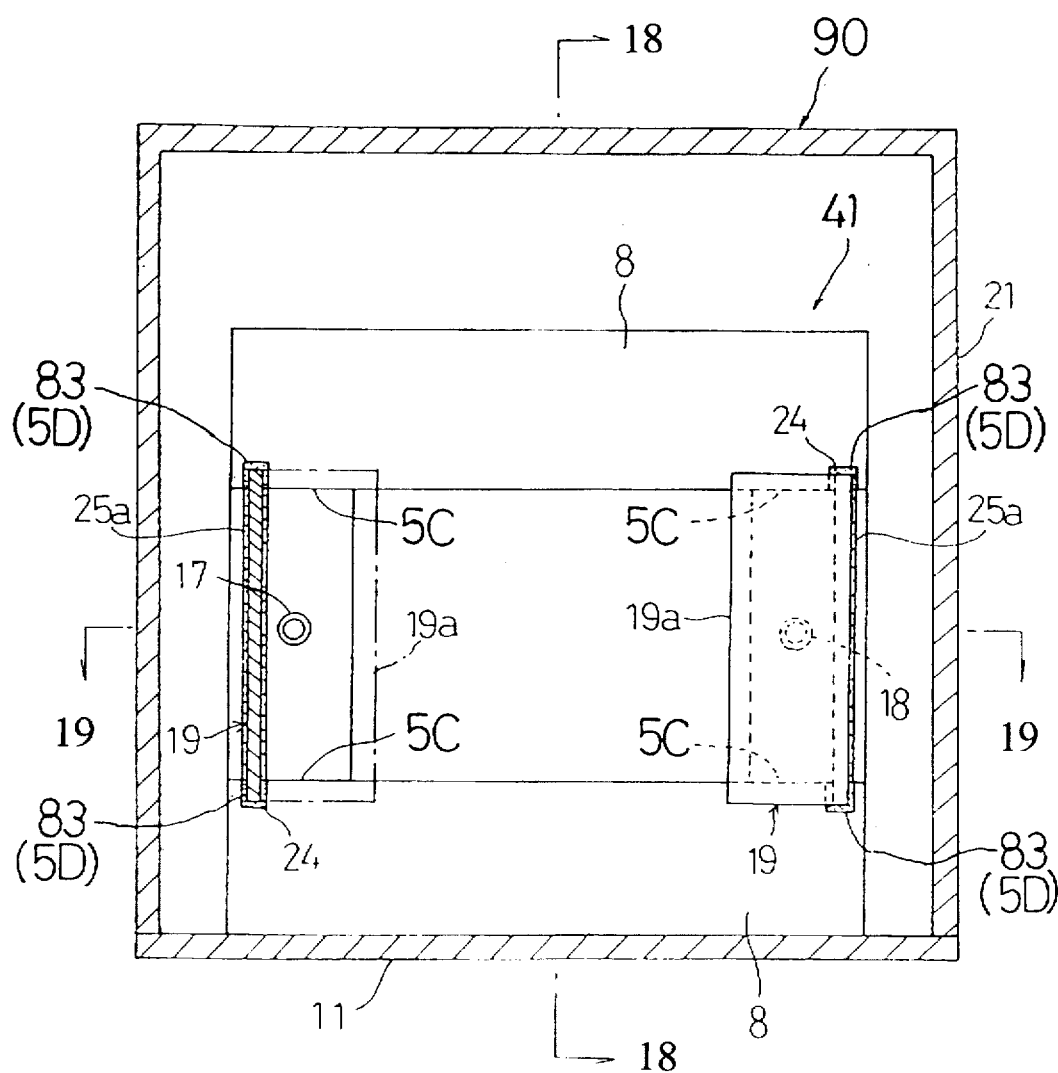
FIG. 17 is a sectional front view of a fuel cell system in the fifth embodiment.
Figure 19:
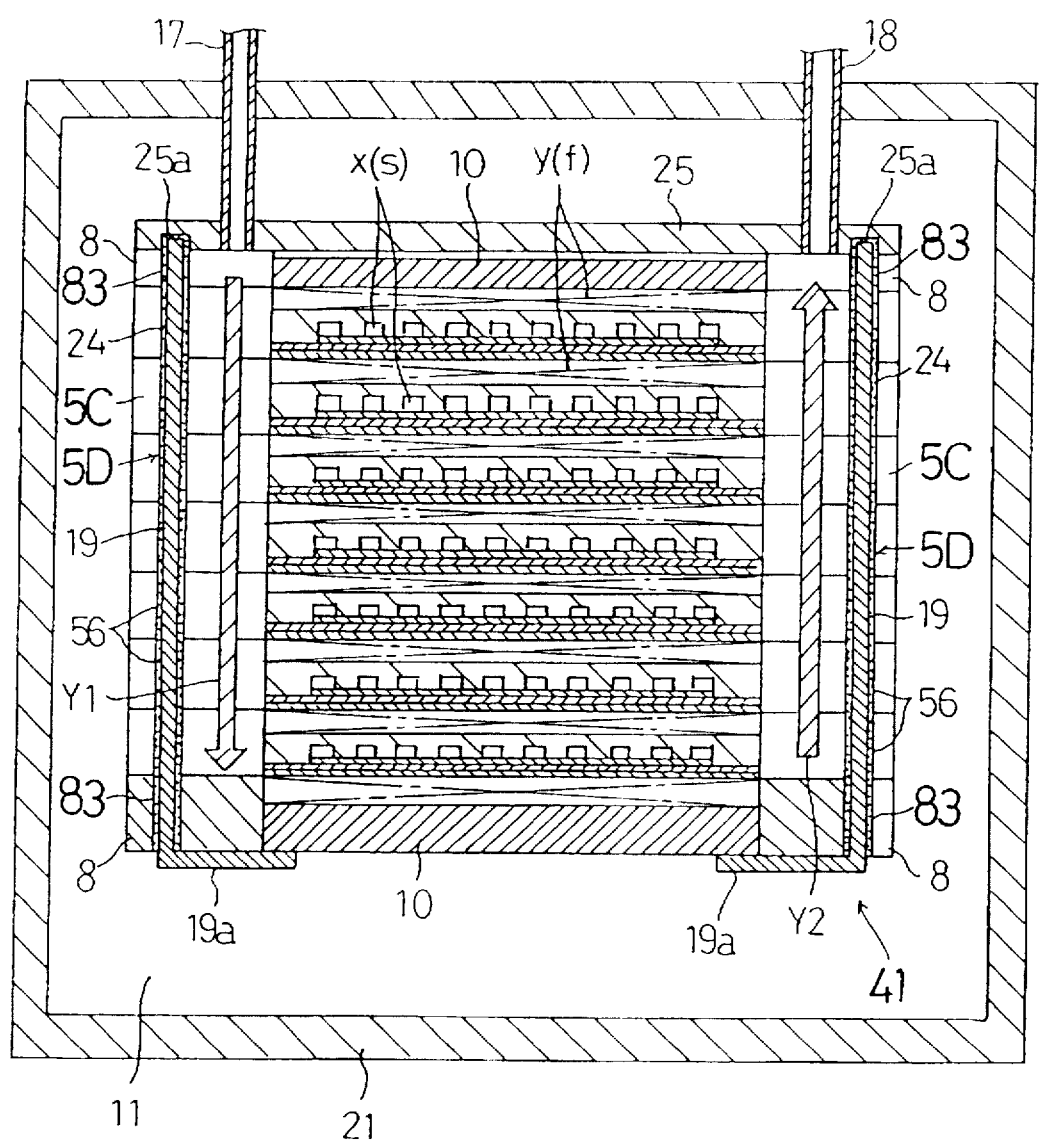
FIG. 19 is a section taken on line 19—19 of FIG. 17.

Next, an overall construction of the fuel cell system will be described with reference to FIGS. 17 through 19.

A plate 25 is disposed at one end in the stacking direction of the cell assembly 41 (at the end having the collecting plate holders 8 defining bores 81). The plate 25 includes grooves 25a continuous with the opposite grooves 5D, respectively.

Partitions 19 with bent portions 19a bent at right angles are connected to the wall surfaces 5C, with three edges of each partition fitted in the grooves 5D and groove 25a, to define an intercellular passage gas supply duct Y1 and an intercellular passage gas exhaust duct Y2. Gaps are provided between the edges of partitions 19 and bottoms of the grooves 5D and between the edges of partitions 19 and bottoms of the grooves 25a.

The partitions 19 may be formed of heat resisting metal plate (e.g. stainless steel plate).

Openings at one end in the stacking direction of the intercellular passage gas supply duct Y1 and exhaust duct Y2 are closed by the bent portions 19a, and openings at the other end are closed by the plate 25.

Openings at one end in the stacking direction of the intracellular passage gas supply duct X1 and exhaust duct X2 are closed by the collecting plate holder 8, and openings at the other end are closed by the plate 25.

Seals 24 are filled into the grooves 5D and grooves 25a. Though not shown, seals are filled also between the bent portions 19a and cell assembly 41. Thus, the intercellular passage gas supply duct Y1 and exhaust duct Y2 are maintained gastight with respect to the ambient.

The above seals are flexible in high temperature conditions during operation of the fuel cell system. As noted above, gaps are provided between the edges of partitions 19 and bottoms of the grooves 5D and between the edges of partitions 19 and bottoms of the grooves 25a. These gaps allow expansion and contraction of the partitions 19 occurring when operation of the fuel cell system is started and stopped, thereby to protect the partitions 19, cell holders 5, plate 25 and the like from damage.

The cell assembly 41 having the above construction is mounted on a base 11, with cells 40 stacked horizontally. A bottomed square enclosure 21 is mounted on the base 11, with an opening of the enclosure 21 facing downward. Thus, the base 11 and bottomed square enclosure 21 constitute a box-shaped housing 90 for enclosing the cell assembly 41.

An intracellular passage gas supply pipe 15 is connected to the intracellular passage gas supply duct X1. An intracellular passage gas exhaust pipe 16 is connected to the intracellular passage gas exhaust duct X2. An intercellular passage gas supply pipe 17 is connected to the intercellular passage gas supply duct Y1. An intercellular passage gas exhaust pipe 18 is connected to the intercellular passage gas exhaust duct Y2.

Though not shown in the drawings, one end of a lead wire is connected to each terminal rod 9, the other end thereof extending outside the box-shaped housing 90, to deliver output power.

[Sixth Embodiment]

Figure 20:
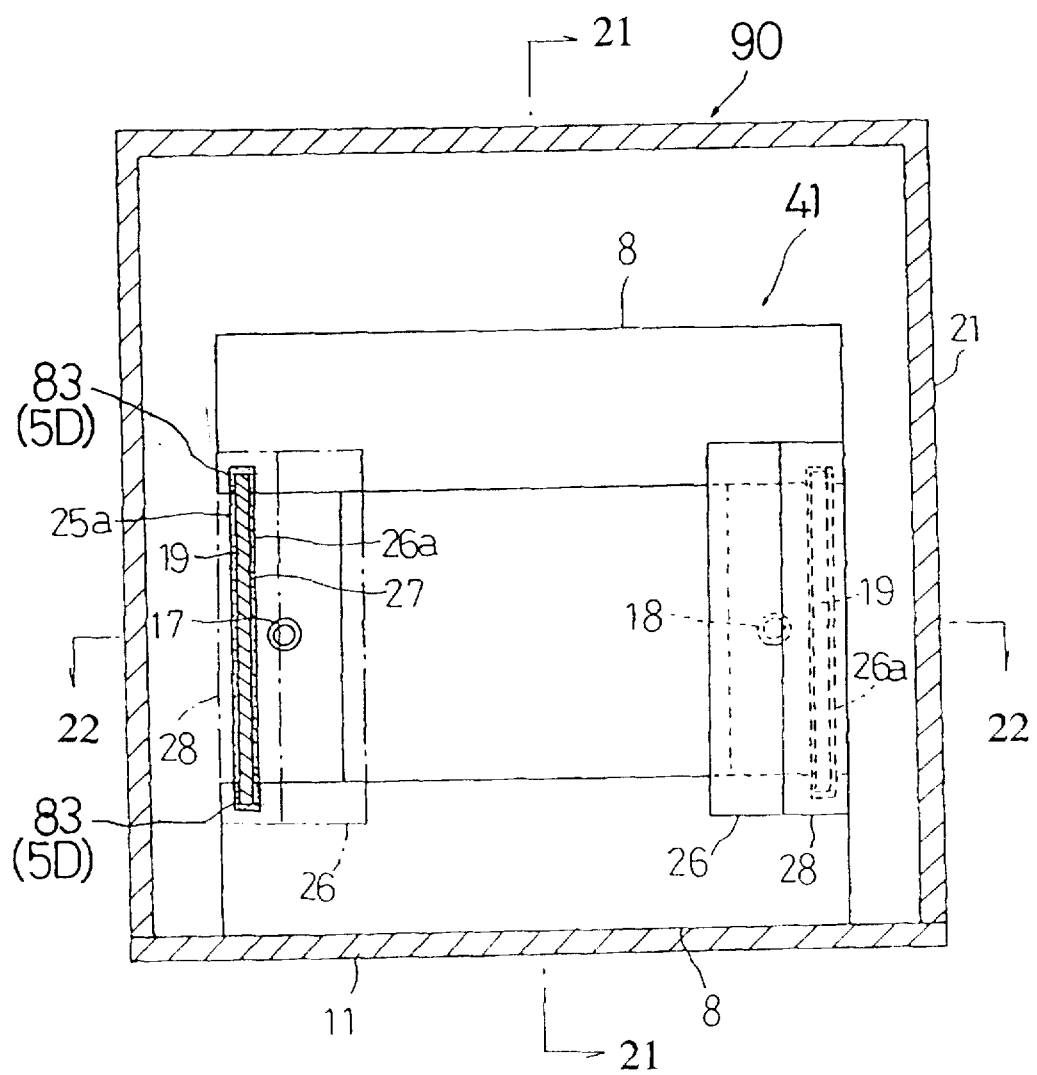
FIG. 20 is a sectional front view of a fuel cell system in a sixth embodiment of the invention.
Figure 21:
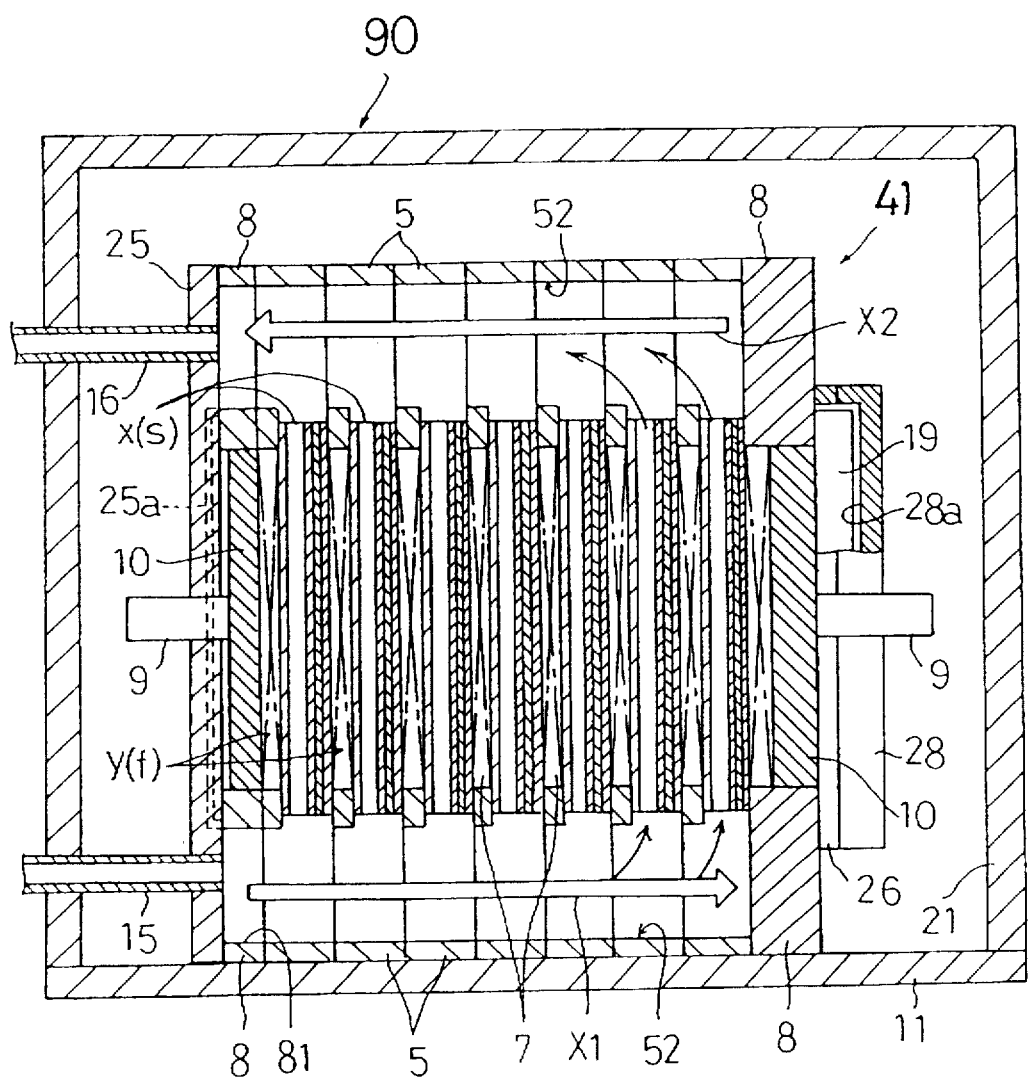
FIG. 21 is a section taken on line 21—21 of FIG. 20.
Figure 22:
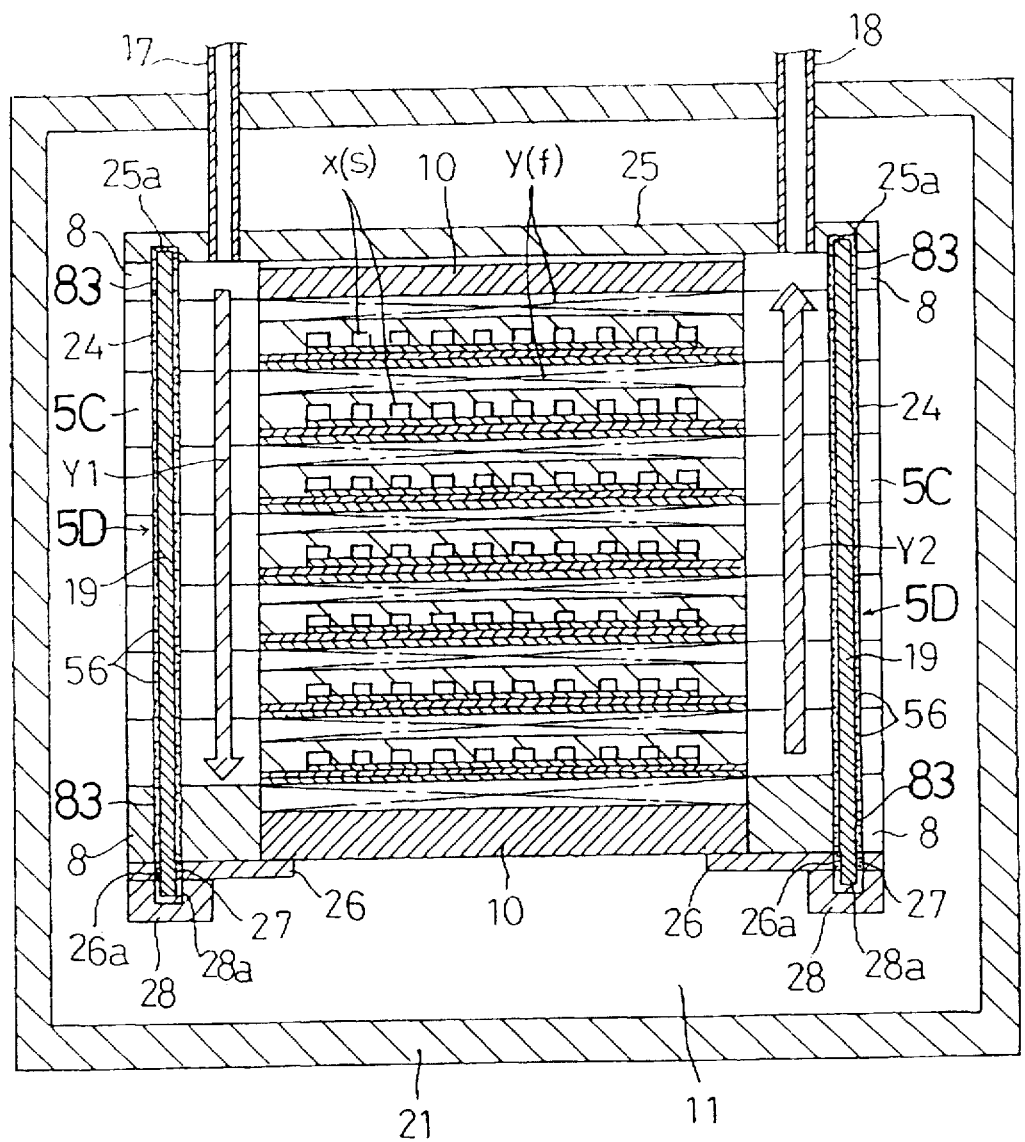
FIG. 22 is a section taken on line 22—22 of FIG. 20.

A sixth embodiment will be described with reference to FIGS. 20 through 22.

The cells 40 are the same as in the first embodiment, and will not be described again. The cell assembly 41 is the same as in the fifth embodiment, and will not be described again.

An overall construction of the fuel cell system will be described hereinafter.

The overall construction of the fuel cell system is the same as the fifth embodiment except the following point.

The partitions 19 do not include bent portions 19a. The partitions 19 are mounted in place, with three edges of each partition fitted in the grooves 5D and groove 25a, and the remaining edge projecting in the stacking direction from the cell assembly 41.

Openings at one end in the stacking direction of the intercellular passage gas supply duct Y1 and exhaust duct Y2 are closed by lids 26 defining slits 26a for receiving the edges of partitions 19 projecting in the stacking direction. The lids 26 are mounted in place with the slits 26a penetrated by the edges of partitions 19 projecting in the stacking direction. Seals 27 are fitted in the slits 26a. The seals 27 are formed of a material flexible in high temperature conditions during operation of the fuel cell system.

Closure members 28 having recesses 28a are placed to cover the slits 26a, with the recesses 28a receiving the edges of partitions 19 projecting in the stacking direction. The closure members 28 assure the gastightness of intercellular passage gas supply duct Y1 and exhaust duct Y2.

[Seventh Embodiment]

A seventh embodiment will be described with reference to FIGS. 25 through 30.

Figure 29:
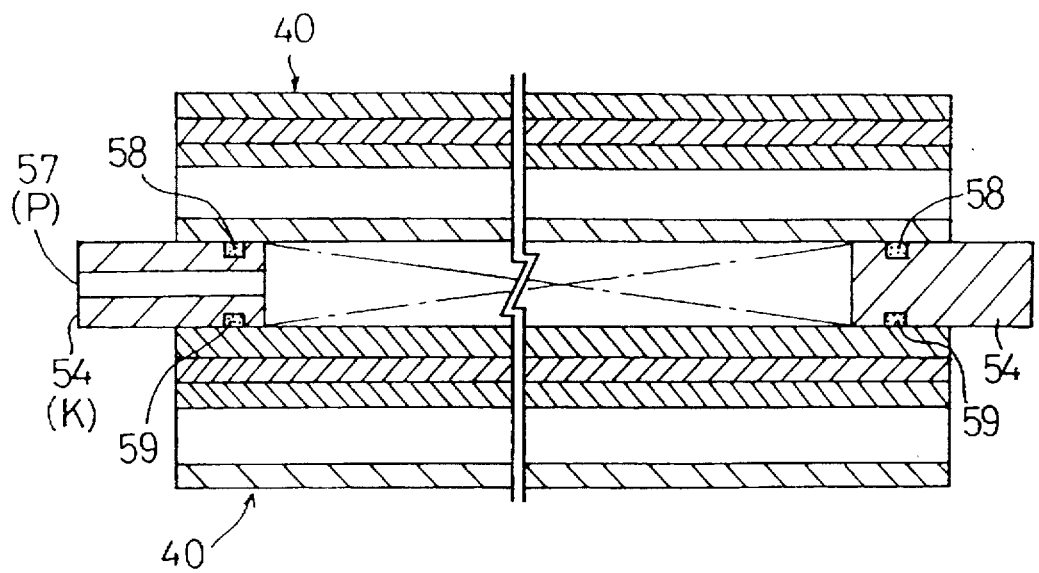
FIG. 29 is a sectional side view of a principal portion of the fuel cell system in the seventh embodiment.

As also shown in FIG. 29, the cell holders 5 have grooves 58 formed in inner surfaces of notches 51 for filling with seals described later. The cell holders 5 also have similar grooves 59 formed in surfaces opposite to the surfaces defining notches 51. The grooves 58 and 58 overlap each other as seen in the stacking direction. Each cell holder 5 forming one of the pair has a plurality of through holes 57 formed in the thin blade 54 left after formation of the notch 51 and having a small material thickness. These through holes 57 extend from the end surface of the thin blade 54 opposed to the bore 52 to the other, opposite end surface thereof.

The cells 40 are stacked with the opposite open sides 40a fitted into the notches 51 of cell holders 5 arranged at opposite sides of the cells 40.

The thin blades 54 secure a space between an adjacent pair of cells 40, and close opposite sides of this space, to define intercellular passage "y" (i.e. fuel gas passage "f") between the adjacent cells 40. The conductive separators 4 act as passage defining elements.

The intracellular passages "x" (i.e. oxygen-containing gas passages "s") and intercellular passage "y" are partitioned from each other in gastight condition by placing the thin blades 54 and the pairs of contact surfaces 53 of the cell holders 5 holding the cell 40, and the reverse surfaces of adjacent cell holders 5, in tight contact with peripheries of the open end surfaces 40b defining the openings of intracellular passages "x" of that cell 40. Heat resisting and electrically insulating seals are fitted in the grooves 58 and 59 to assure the gastight condition.

As noted above, the cells 40 are stacked with the opposite open sides 40a fitted into the notches 51 of cell holders 5 arranged at opposite sides of the cells 40. In this state, the bores 52 of the cell holders 5 form two ducts extending in the cell stacking direction. The duct defined by the cell holders 5 not having through holes 57 is used as an oxygen-containing gas supply duct S for supplying an oxygen-containing gas to the intracellular passages "x". The duct defined by the cell holders 5 having through holes 57 is used as a gas exhaust duct E to which the oxygen-containing gas is exhausted from the intracellular passages "x" and the fuel gas is exhausted from the intercellular passages "y". As shown in broken lines 6 in FIG. 25, seals are mounted also between cell holders 5 arranged adjacent each other in the stacking direction, to secure gastightness of oxygen-containing gas supply duct S and gas exhaust duct E.

Thus, the thin blades 54 of cell holders 5 act as space forming elements K arranged between adjacent cells 40 to maintain a space therebetween. These space forming elements K project toward the gas exhaust duct E. The portions of the cell holders 5 other than the thin blades 54 act as exhaust duct forming portions H having a thickness substantially corresponding to a sum of the space between adjacent cells 40 and the thickness of the cells 40.

The through holes 57 extend through the thin blades 54 from the end opposed to the intercellular passages "y" to the end opposed to the gas exhaust duct E to act as penetrating portions P. The through holes 57 define fuel gas passage extensions Lf extending to positions spaced from end surfaces of cells 40, so that the intercellular passages "y" have outlets "fo" opening in positions spaced from the end surfaces of cells 40.

The openings of through holes 57 opposed to the gas exhaust duct E act as outlet "fo" of intercellular passages "y".

Outlets "so" of the intracellular passages "x" are defined between the end surfaces opposed to the gas exhaust duct E of the thin blades 54 adjacent each other in the stacking direction. Thus, the spaces between the thin blades 54 adjacent each other in the stacking direction act as oxygen-containing gas passage extensions Ls extending to positions spaced from end surfaces of cells 40, so that the intracellular passages "x" have outlets "so" opening in positions spaced from the end surfaces of cells 40.

The openings of intracellular passages "x" opposed to the oxygen-containing gas supply duct S act as inlets "si" of intracellular passages "x".

The space between the closed end surfaces 40c of adjacent cells 40 are used as inlet "fi" of the intercellular passages "y".

Thus, the oxygen-containing gas passage extensions Ls and fuel gas passage extensions Lf are formed at one of the four end surfaces of each cell 40. The inlets "si" of intracellular passages "x" are formed at the end surface opposed to the end surface providing the oxygen-containing gas passage extensions Ls and fuel gas passage extensions Lf. The inlets "fi" of intercellular passages "y" are formed at the opposite end surfaces adjacent the end surface providing the oxygen-containing gas passage extensions Ls and fuel gas passage extensions Lf.

As noted above, the cells 40 are stacked with the opposite open sides 40a fitted into the notches 51 of cell holders 5 arranged at opposite sides of the cells 40. This stacking structure includes a pair of space forming plates 84 arranged at an upper end thereof. The stacking structure further includes a pair of collecting plate holders 8 arranged at each of the upper and lower ends thereof. The upper and lower collecting plate holders 8 close the oxygen-containing gas supply duct S and gas exhaust duct E.

The space forming plates 84 and collecting plate holders 8 have the same planar configuration as the cell holders 5, and are stacked on the cell holders 5. The space forming plates 84 define bores 81 corresponding in shape to the bores 52 of cell holders 5 as seen in plan. One of the space forming plates 84 defines through holes 85 similar to the through holes 57 formed in the thin blades 54 of cell holders 5.

Figure 30:
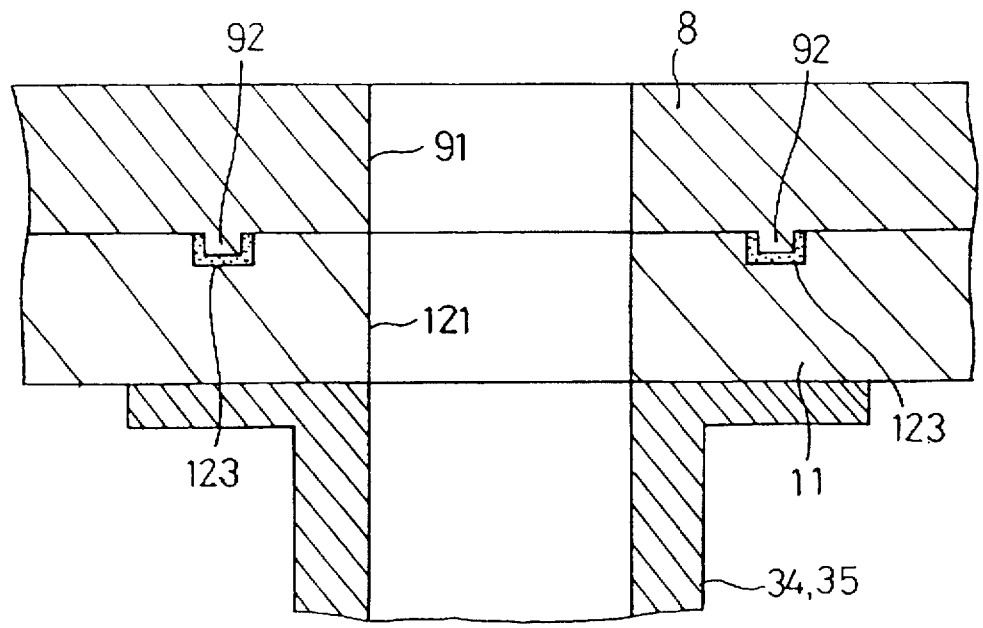
FIG. 30 is a sectional side view of another principal portion of the fuel cell system in the seventh embodiment.

As also shown in FIG. 30, each of the lower collecting plate holders 8 defines a bore 91 and an annular projection 92 which will be described later.

The collecting plate holders 8 at each end support a collecting plate 10 placed in contact with flexible conductive material 7 and having a terminal rod 9 fixed to the collecting plate 10. Output power is taken out through the opposite terminal rods 9.

The space forming plates 84 and collecting plate holders 8 are formed of a ceramic material which is electrically insulative and has excellent resistance to heat.

The above is the construction of cell assembly 41.

Figure 26:
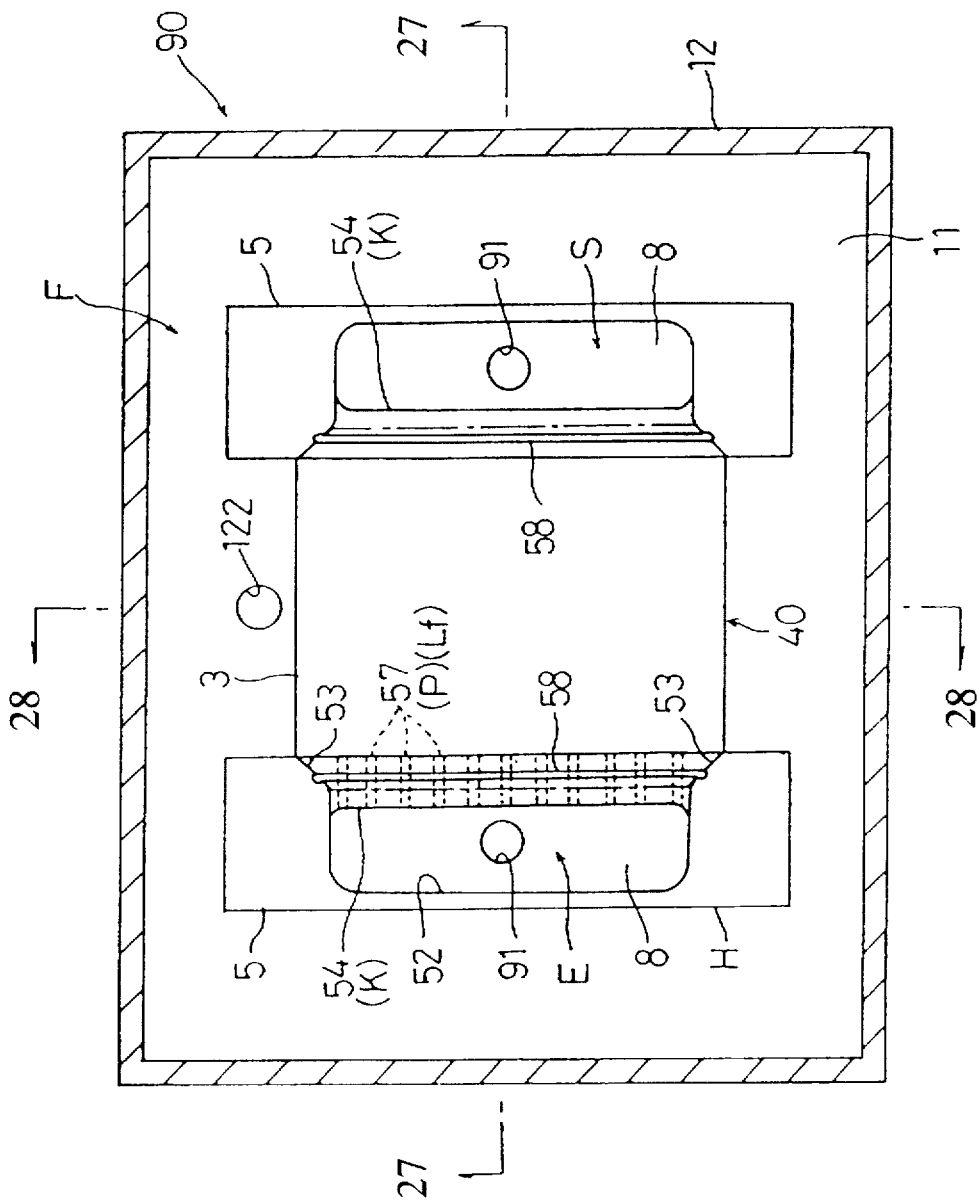
FIG. 26 is a sectional plan view of a fuel cell system in the seventh embodiment.
Figure 27:
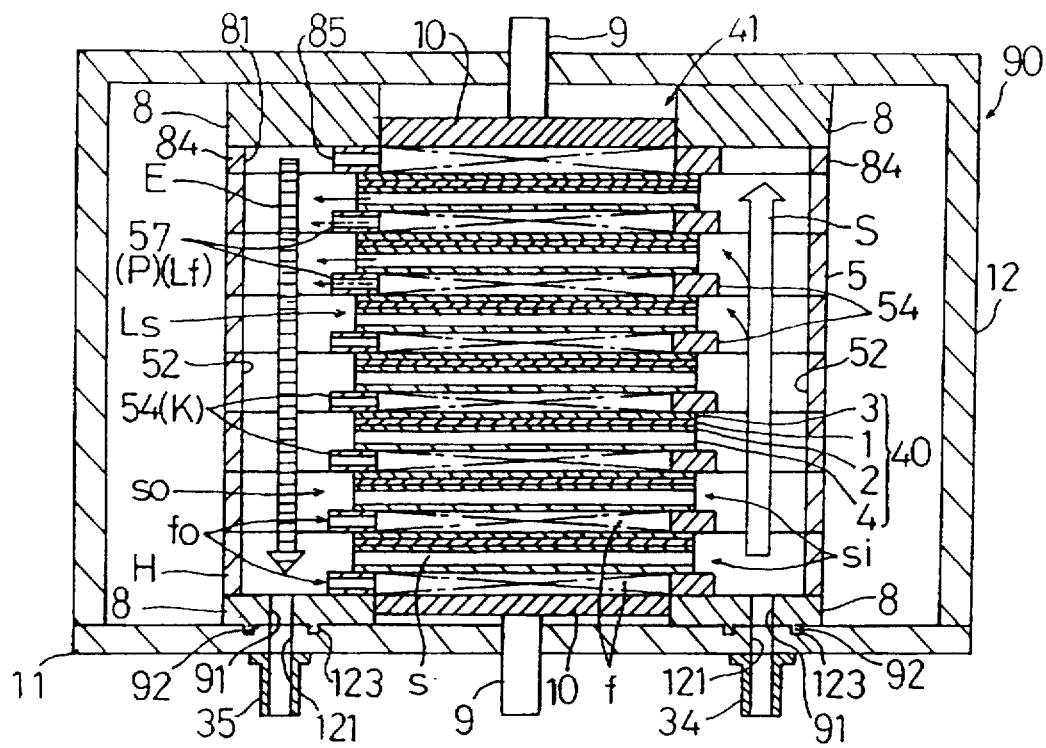
FIG. 27 is a section taken on line 27—27 of FIG. 26.
Figure 28:
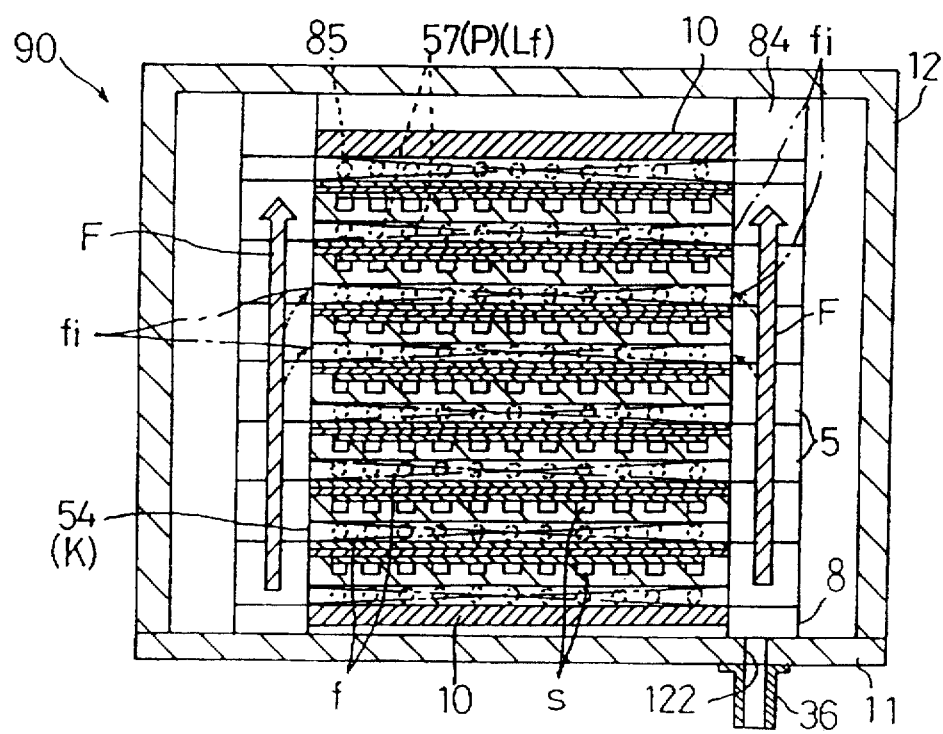
FIG. 28 is a section taken on line 28—28 of FIG. 26.

Next, an overall construction of the fuel cell system will be described with reference to FIGS. 26 through 28.

The cell assembly 41 described above is mounted on a base 11, and is surrounded by a bottomed square enclosure 12 also mounted on the base 11, with an opening of the enclosure 21 facing downward.

Thus, the base 11 and bottomed square enclosure 21 constitute a box-shaped housing 90 for enclosing the cell assembly 41.

One of the terminal rods 9 extends through the bottom of square enclosure 21 in gas tight condition, to project from the box-shaped housing 90. The other terminal rod 9 extends through the base 11 in gas tight condition, to project from the box-shaped housing 90.

The inlets "fi" of intercellular passages "y" open to the interior of the box-shaped housing 90. Thus, the interior of box-shaped housing 90 is used as a fuel gas supply duct F for supplying the fuel gas to the intercellular passages "y".

As also shown in FIG. 30, the base 11 defines bores 121 continuous with the bores 91 of collecting plate holders 8, and a bore 122 communicating with the interior of box-shaped housing 90. The base 11 further defines annular grooves 123 for loosely receiving the annular projections of collecting plate holders 8 when the cell assembly 41 is mounted on the base 11. Seals are filled into the annular grooves 123 to secure a gastight condition between the collecting plate holders 8 and base 11.

An oxygen-containing gas supply pipe 34 is connected to the bore 121 of base 11 communicating with the oxygen-containing gas supply duct S. A gas exhaust pie 35 is connected to the bore 121 of base 11 communicating with the gas exhaust duct E. A fuel gas supply pipe 36 is connected to the bore 122 of base 11.

In this embodiment, the plurality of through holes 57 provide penetrating portions P. However, the penetrating portions P may have varied constructions. For example, a single flat through hole may be provided in the direction of arrangement of each pair of contact surfaces 53.

[Eighth Embodiment]

Figure 32:
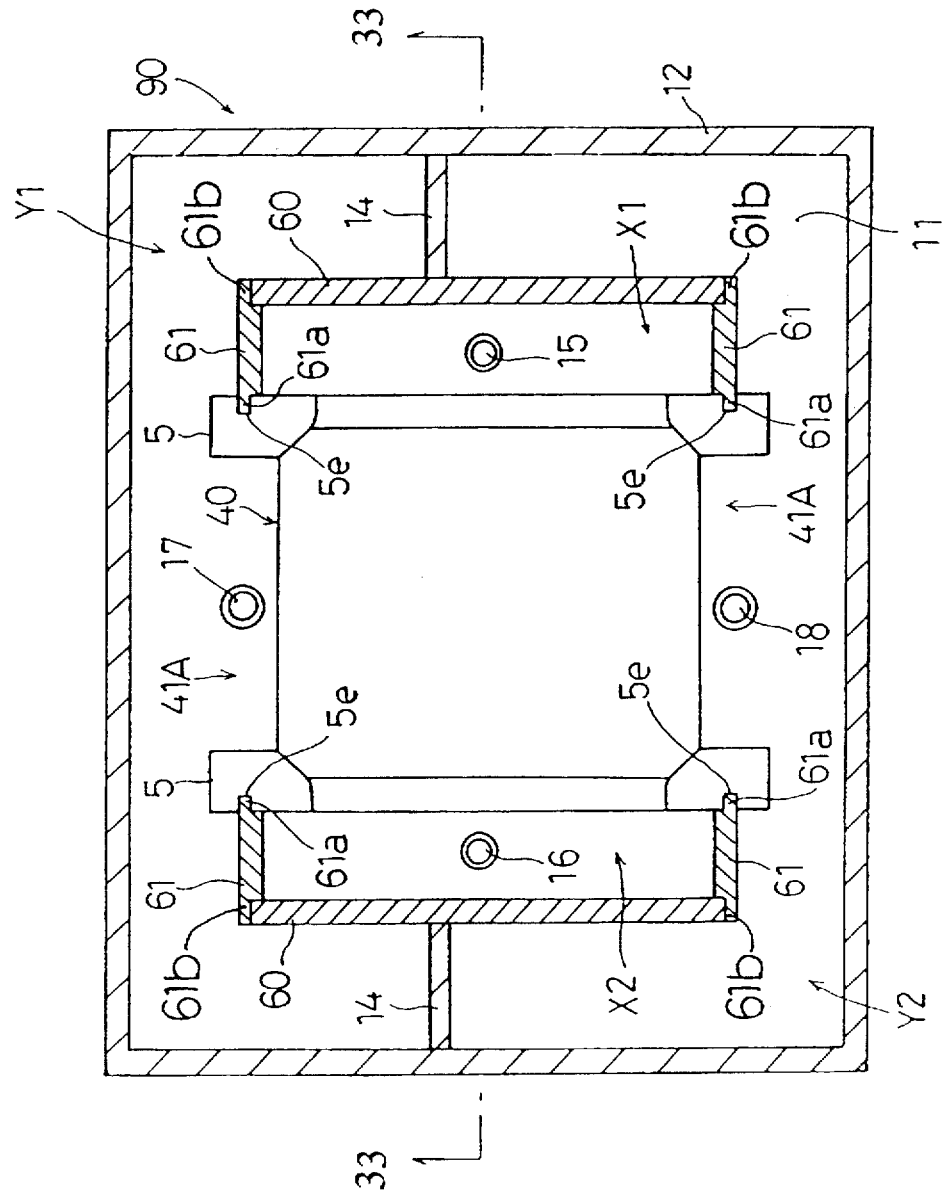
FIG. 32 is a sectional plan view of a fuel cell system in the eighth embodiment.
Figure 33:
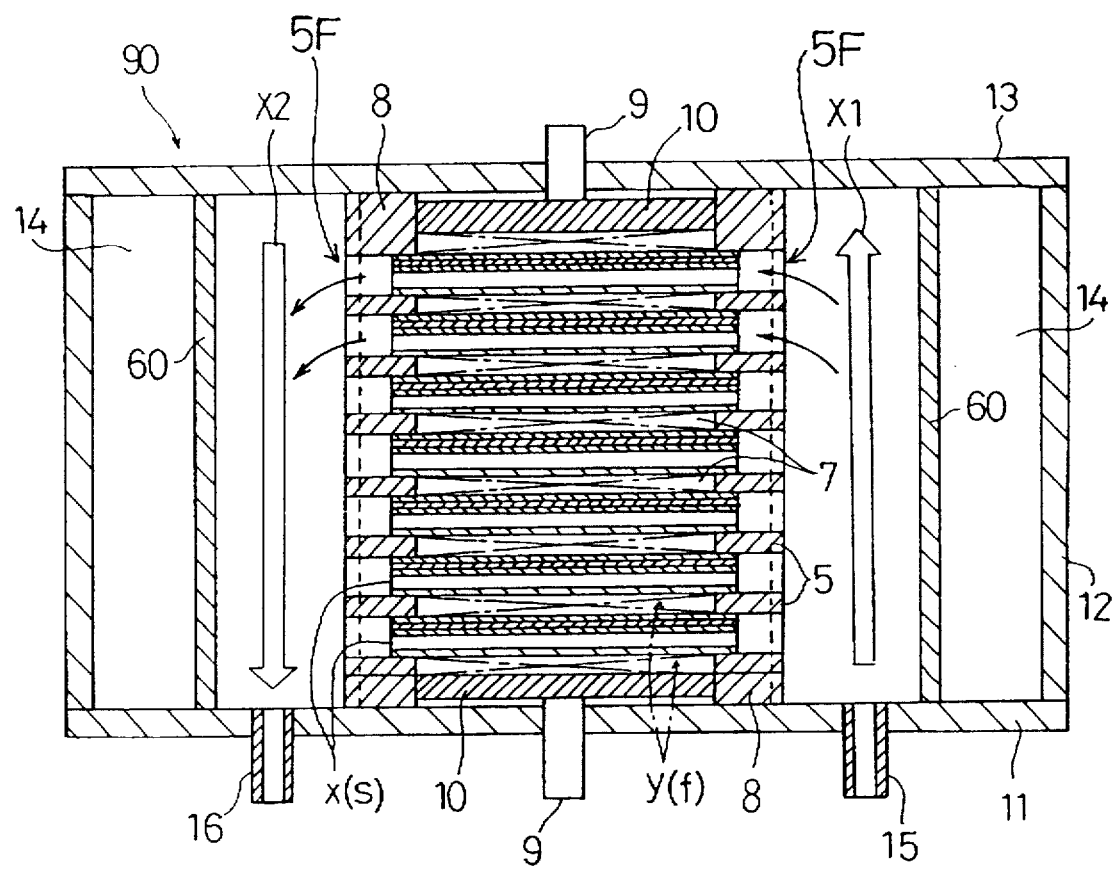
FIG. 33 is a section taken on line 33—33 of FIG. 32.

An eighth embodiment will be described with reference to FIGS. 31 through 33. The description will be centered on the differences from the first embodiment.

Figure 31:
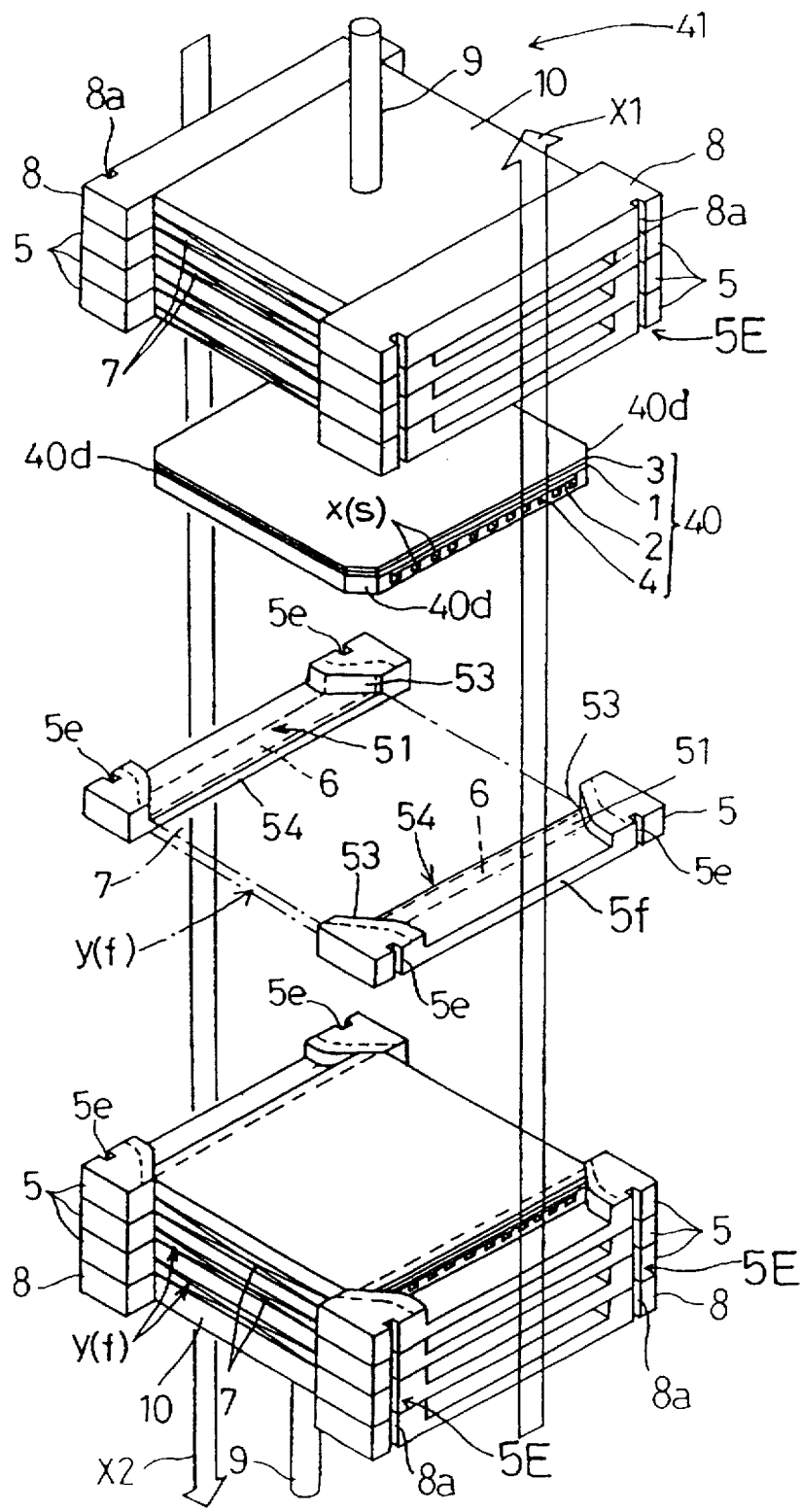
FIG. 31 is an exploded perspective view showing a stacking structure of a cell assembly in an eighth embodiment of the invention.

The cell holders 5 shown in FIG. 31 define notches 51 for receiving the open sides 40a of cells 40. Each notch 51 has a pair of contact surfaces 53 for tight contact with the closed end surfaces 40c adjacent opposite ends of the open side 40a fitted into the notch 51. The notch 51 to the thickness substantially corresponding to the thickness of cell 40.

The pair of contact surfaces 53 are inclined to approach each other toward the open side 40a of cell 40 as seen in the cell stacking direction. As distinct from the first embodiment, the cell holders 5 here do not define bores for forming the intracellular passage gas duct X1 or X2. The cell holders 5 without such bores may be manufactured at reduced cost.

Each cell holder 5 includes two cutouts 5e in the end surface 5f thereof opposed to the intracellular passage gas duct X1 or X2. These cutouts 5e, preferably, are formed in positions other than the thin blade 54.

The cell assembly 41 includes collecting plate holders 8 arranged at opposite ends thereof. Each collecting plate holder 8 defines cutouts 8e similar to those of the cell holders 5. The cutouts 5e and 8e form grooves 5E extending over the entire length in the cell stacking direction.

Next, an overall construction of the fuel cell system will be described with reference to FIGS. 32 and 33.

The intracellular passage gas supply duct X1 and intracellular passage gas exhaust duct X2 are constructed as follows. Each of the intracellular passage gas supply duct X1 and intracellular passage gas exhaust duct X2 has a rectangular sectional shape, and is defined by a first wall member 60 extending parallel to the end surfaces 5f of cell holders 5, and two second wall members 61 extending perpendicular to the end surfaces 5f.

The second wall members 61 have a planar shape, and each includes a stepped portion 61a formed at one end thereof. This stepped portion 61a is fitted into one of the grooves 5E. Each of the second wall members 61 includes a stepped portion 61b at the other end thereof also. As shown in FIG. 32, each of the first wall portion 60 is disposed between a pair of opposite stepped portions 61b. The cell holders 5, first wall members 60 and second wall members 61 are fixed in an appropriate way such as by bonding. The first wall members 60 and second wall members 61, preferably, are formed of a ceramic material which has excellent resistance to heat.

The cell assembly 41 is mounted on the base 11, and is surrounded by a square enclosure 12 also mounted on the base 11. The base 11 closes a lower opening of the square enclosure 12, and lower openings of the intracellular passage gas supply duct X1 and exhaust duct X2.

An upper opening of the square enclosure 12 and upper openings of the intracellular passage gas supply duct X1 and exhaust duct X2 are closed by a lid 13.

Thus, the base 11, square enclosure 12 and lid 13 constitute a box-shaped housing 90 for enclosing the cell assembly 41. The open sides of the cell assembly 41 are opposed to the interior of the box-shaped housing 90. In other words, the closed end surfaces 40c are opposed to the interior of the box-shaped housing 90, with the intercellular passages "y" opening to the interior of the box-shaped housing 90.

One of the terminal rods 9 extends through the lid 13 in gas tight condition, to project from the box-shaped housing 90. The other terminal rod 9 extends through the base 11 in gas tight condition, to project from the box-shaped housing 90.

One partition 14 is connected to an outer surface of one of the first wall members 60 and an inner surface of the box-shaped housing 90, i.e. an inner surface of the base 11, an inner surface of the square enclosure 12 and an inner surface of the lid 13. Another partition 14 is connected to an outer surface of the other first wall member 60 and an inner surface of the box-shaped housing 90, i.e. an inner surface of the base 11, an inner surface of the square enclosure 12 and an inner surface of the lid 13. Thus, the interior of the box-shaped housing 90 is divided into two parts. One of the open sides 41A of the cell assembly 41 is opposed to one of the two divided parts. The other open side 41A is opposed to the other divided part. Thus, one of the two divided parts is used as intercellular passage gas supply duct Y1, and the other as intercellular passage gas exhaust duct Y2.

An intracellular passage gas supply pipe 15 is connected to the intracellular passage gas supply duct X1. An intracellular passage gas exhaust pipe 16 is connected to the intracellular passage gas exhaust duct X2. An intercellular passage gas supply pipe 17 is connected to the intercellular passage gas supply duct Y1. An intercellular passage gas exhaust pipe 18 is connected to the intercellular passage gas exhaust duct Y2.

[Ninth Embodiment]

Figure 34:
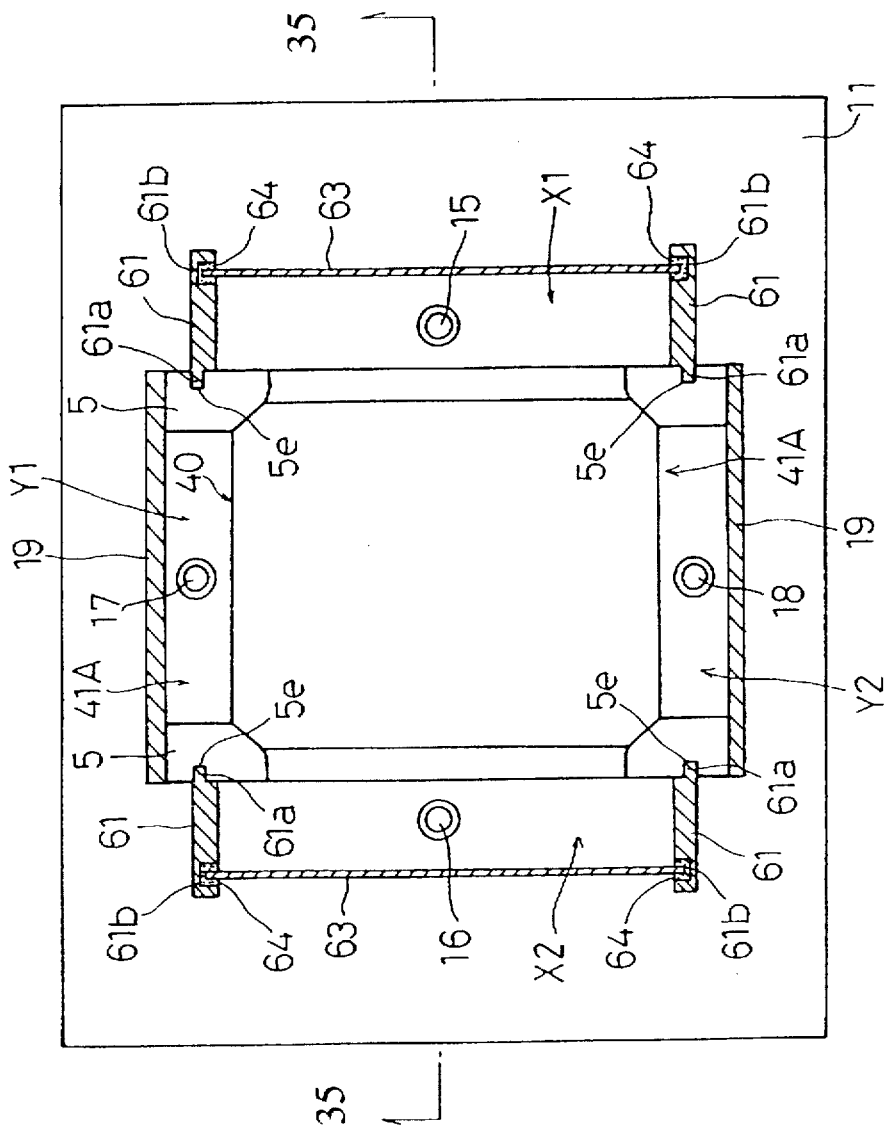
FIG. 34 is a sectional plan view of a fuel cell system in a ninth embodiment of the invention.

A ninth embodiment will be described with reference to FIGS. 34 and 35.

The description will be centered on the differences from the eighth embodiment. As seen from FIG. 34, this embodiment includes second wall members 63 formed of metal plate. The second wall members 63 may be formed of heat resistant metal (e.g. stainless steel).

Each pair of first wall members 61 define grooves 61b for receiving one of the second wall members 63, thereby to define intracellular passage gas supply duct X1 and exhaust duct X2.

Seals 64 are filled into the respective grooves 61b.

Figure 35:
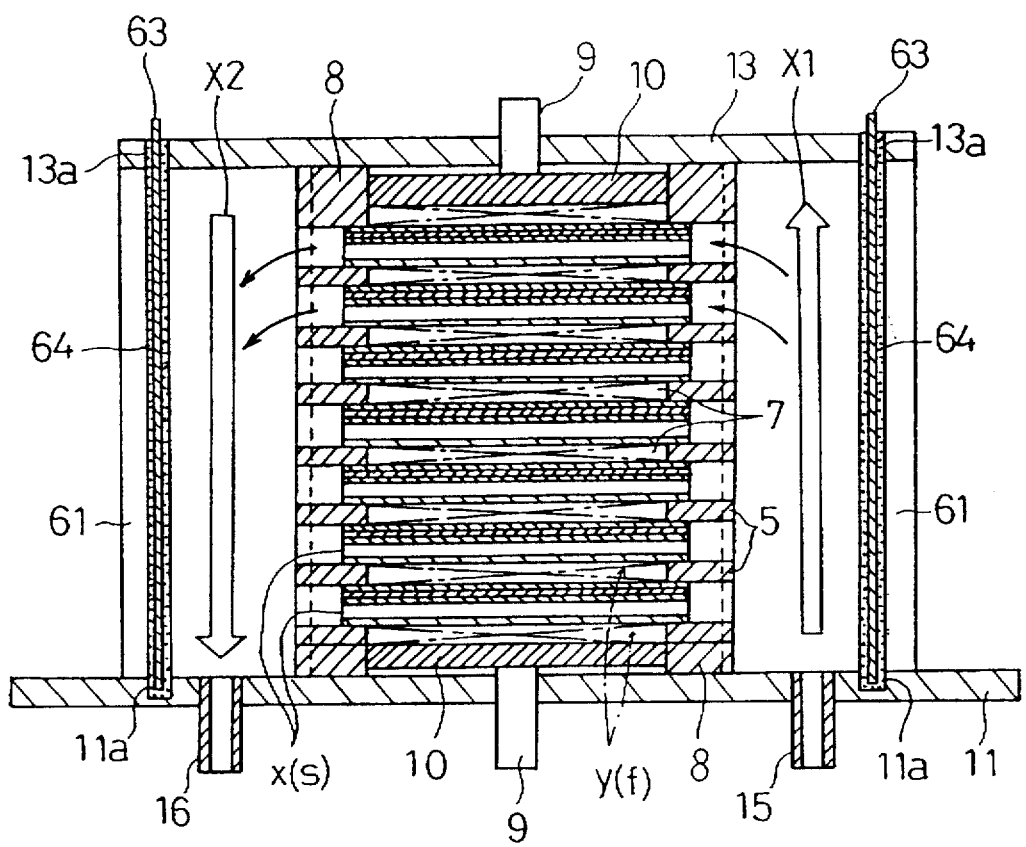
FIG. 35 is a section taken on line 25—35 of FIG. 34.
Figure 36:
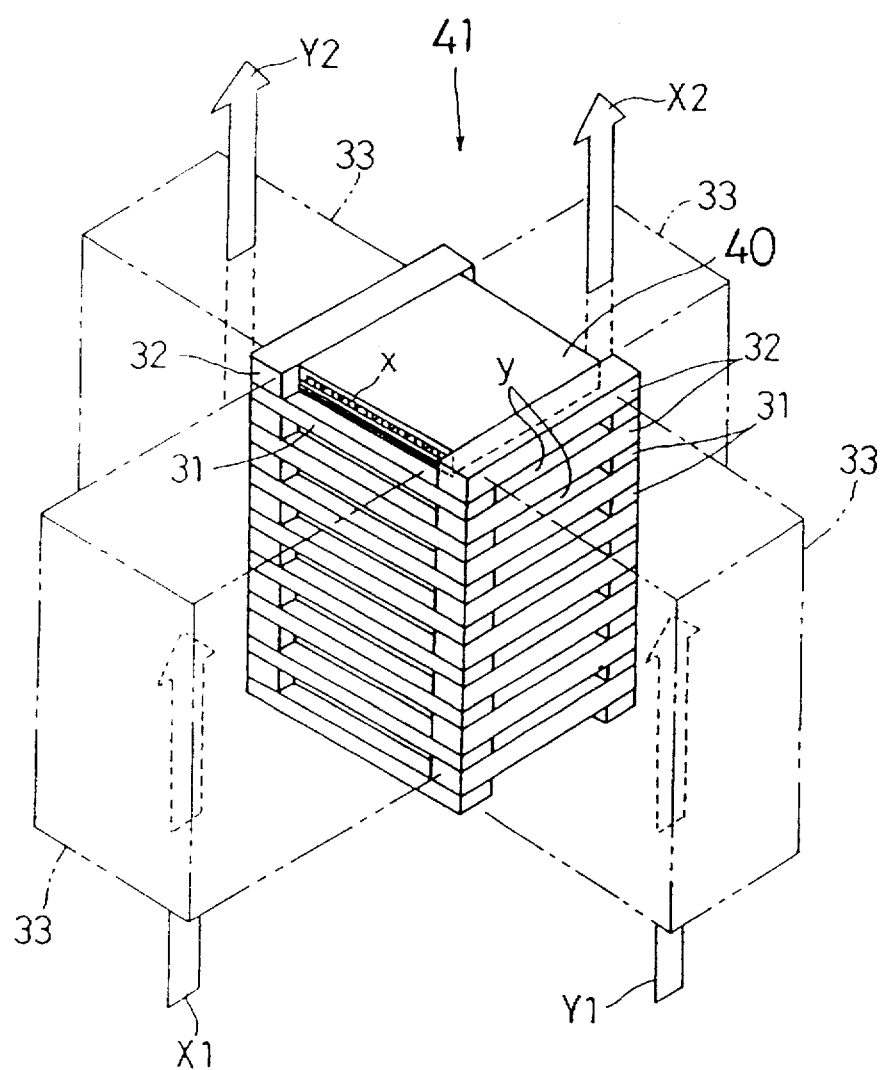
FIG. 36 is a perspective view of a conventional fuel cell system.

As shown in FIG. 35, the base 11 also defines grooves 11a each for receiving one end of one of the second wall members 63. The lid 13 defines slots 13a each for receiving the other end of one of the second wall members 63, so that the other end project from the lid 13. Seals 64 are filled into these grooves 11a and slots 13a.

The seals 64 assure gastightness with respect to the ambient of the intracellular passage gas supply duct X1 and exhaust duct X2.

The seals 64 are formed of a material flexible in high temperature conditions during operation of the fuel cell system. Gaps are provided between edges of the second wall members 63 and bottoms of the grooves 61, between edges of the second wall members 63 and bottoms of the grooves 11a, and between edges of the second wall members 63 and slots 13a. These gaps allow expansion and contraction occurring when operation of the fuel cell system is started and stopped, thereby to protect the first wall members 61, second wall members 63 and cell holders 5 from damage.

Figure 9:
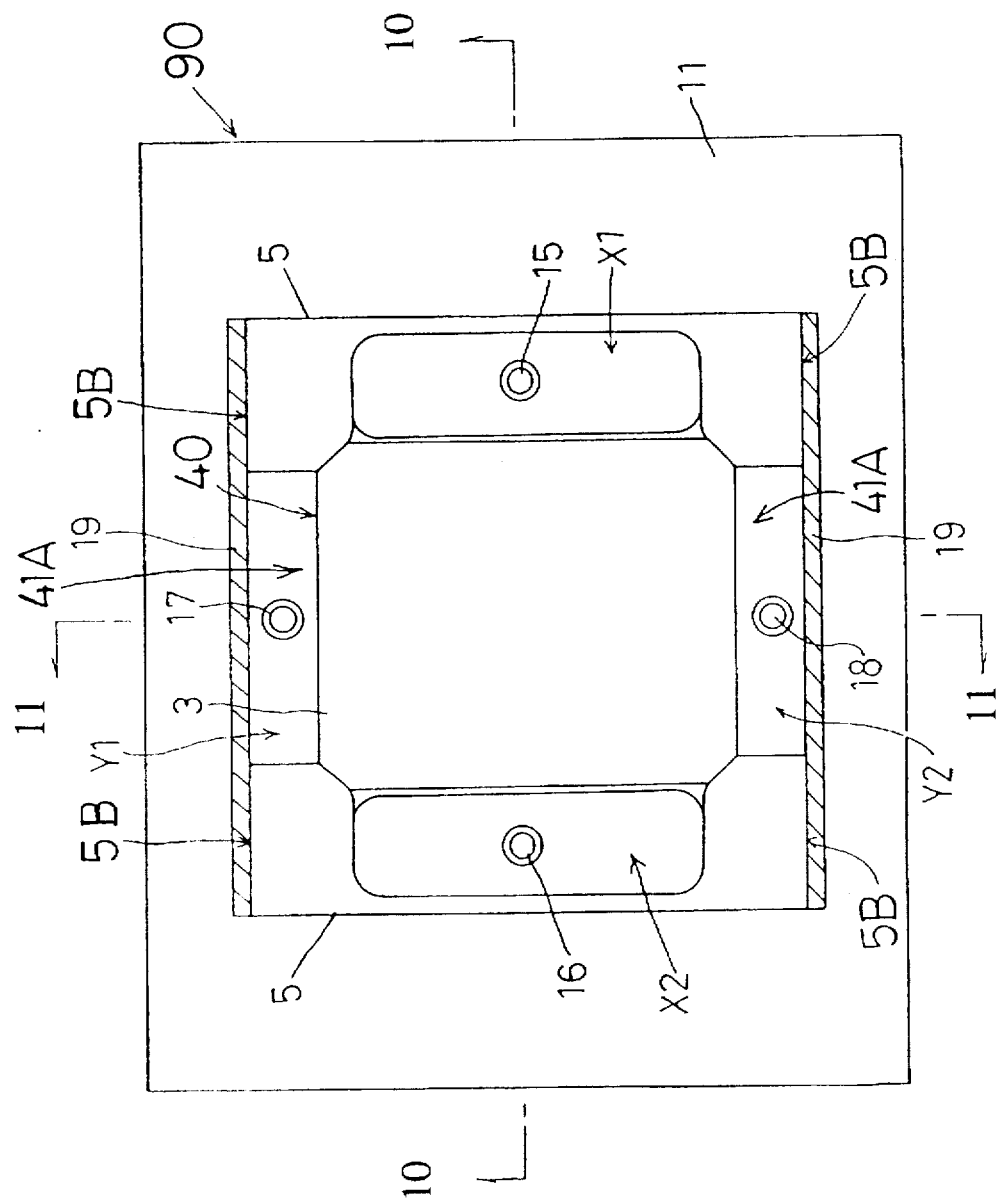
FIG. 9 is a sectional plan view of a fuel cell system in a third embodiment of the invention.

The intracellular passage gas supply duct X1 and exhaust duct X2 are basically the same as those in the third embodiment shown in FIG. 9.

This embodiment may be modified such that the two first wall members 61 and one second wall member 63 may be formed of one metal plate. This modification requires a reduced number of components, thereby simplifying the overall construction of the fuel cell system.

Further, the second wall members 63 may include bent portions as do the partitions 19 in the fifth embodiment. Thus, each of the intracellular passage gas supply duct X1 and exhaust duct X2 may have the opening at one end in the stacking direction closed by the bent portion, and the opening at the other end closed by the base 11.

[Other Embodiments]

Other embodiments are listed hereinafter.

(1) In the foregoing embodiments, the contact surfaces 53 forming a pair are both inclined. Instead, only one of the pair may be inclined. In this case, the incline 40d need not be formed on the closed end surface 40c of cell 40 opposed to the contact surface 53 not inclined.

(2) In the second and third embodiments, the partitions 19 have a planar shape. However, the partitions 19 may have varied shaped, e.g. channel-shaped or arcuate as seen in the cell stacking direction.

Figure 23:
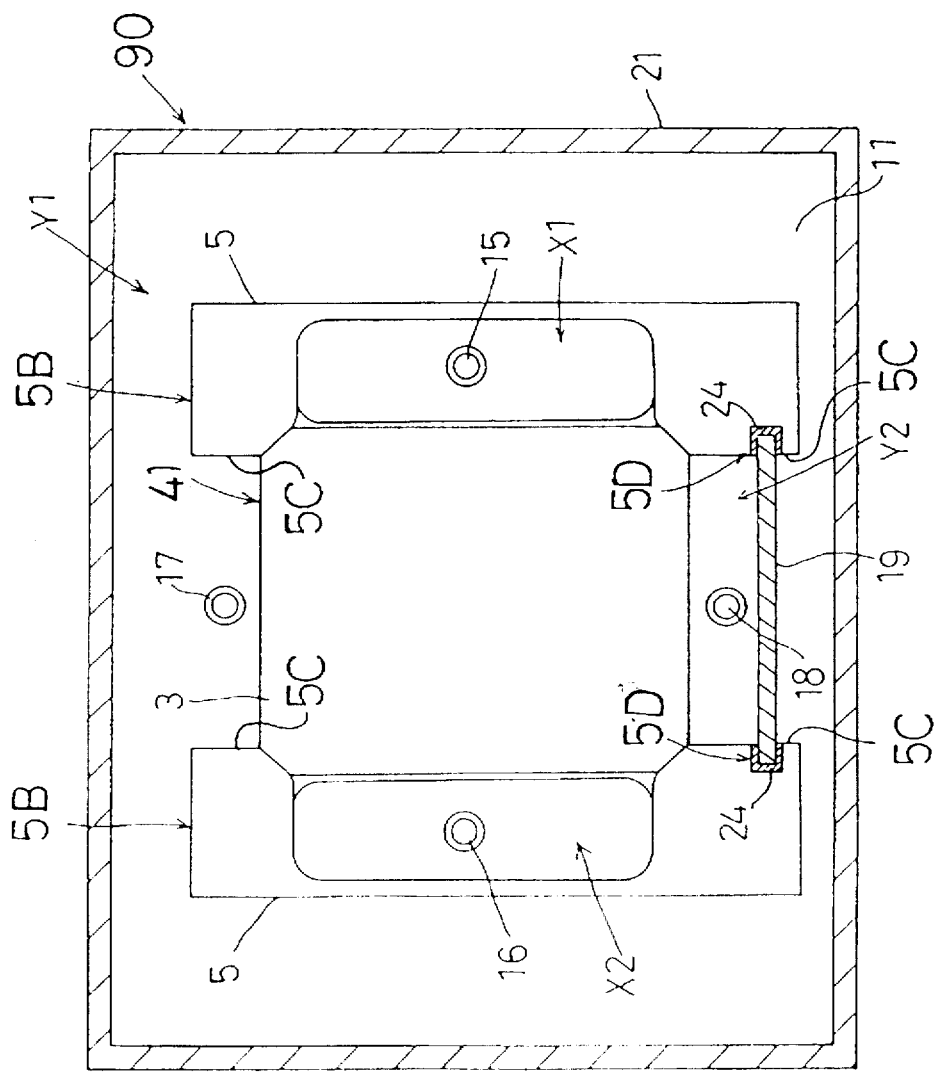
FIG. 23 is a sectional plan view of a fuel cell system in a modified embodiment.

(3) The second embodiment may be modified as shown in FIG. 23. In this modification, a groove 5D is formed in a wall surface 5C defined by end surfaces of the cell holders 5 and collecting plate holders 8 stacked at each side. The partition 19 is connected to the wall surfaces 5C, with opposite ends thereof fitted into the respective grooves 5D. Seals 24 are mounted in the grooves 5D to secure gastightness of intercellular passage gas supply duct Y1 and gas exhaust duct Y2 with respect to the ambient.

Figure 24:
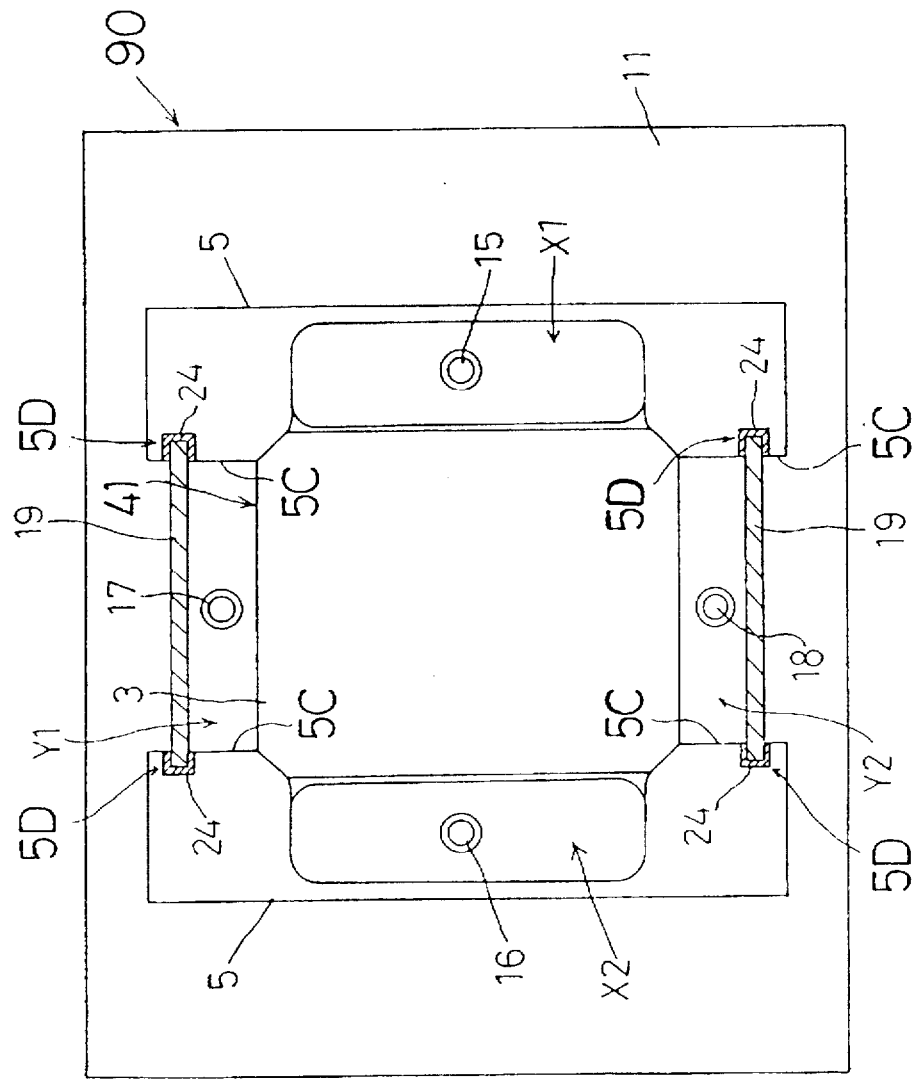
FIG. 24 is a sectional plan view of a fuel cell system in another modified embodiment.
Figure 25:
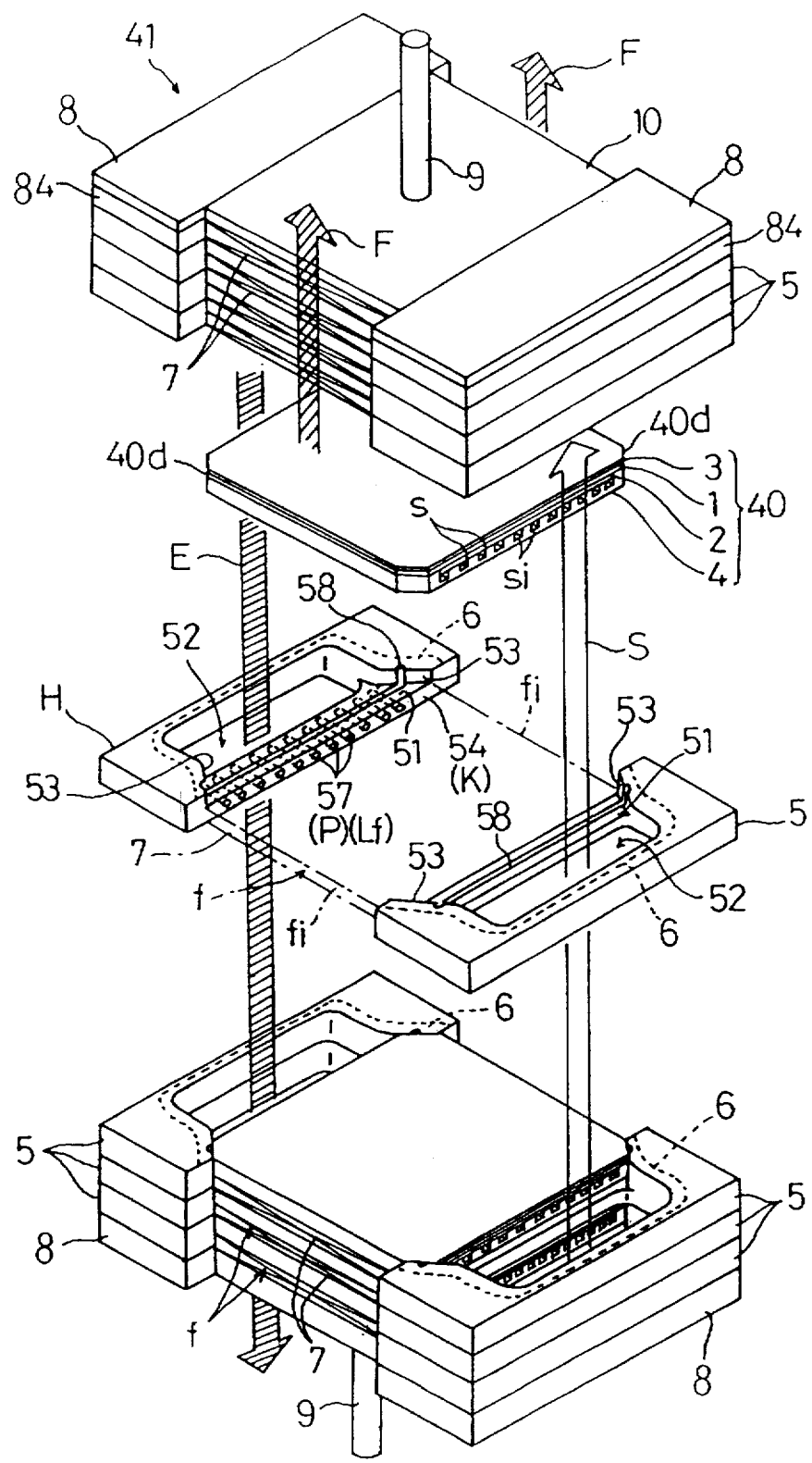
FIG. 25 is an exploded perspective view showing a stacking structure of a cell assembly in a seventh embodiment of the invention.

(4) The third embodiment may be modified as shown in FIG. 24. In this modification, grooves 5D are formed in wall surfaces 5C defined by end surfaces of the cell holders 5 and collecting plate holders 8 stacked at each side. The partitions 19 are connected to the wall surfaces 5C, with opposite ends thereof fitted into the respective grooves 5D. Seals 24 are mounted in the grooves 5D to secure gastightness of intercellular passage gas supply duct Y1 and gas exhaust duct Y2 with respect to the ambient.

(5) In the second embodiment, the space defined between the partition 19 and the open side 41A of the cell assembly 41 is used as intercellular passage gas exhaust duct Y2, and the interior of box-shaped housing 90 as intercellular passage gas supply duct Y1. Instead, the space defined between the partition 19 and the open side 41A of the cell assembly 41 may be used as intercellular passage gas supply duct Y1, and the interior of box-shaped housing 90 as intercellular passage gas exhaust duct Y2.

(6) The cell assembly 41 having cells 40 stacked vertically as in the first, second, third or fourth embodiment may be placed on the base 11 so that the stacking direction be horizontal.

(7) The cell assembly 41 having cells 40 stacked horizontally as in the fifth embodiment may be placed on the base 11 so that the stacking direction be vertical.

(8) In each of the foregoing embodiments, each cell 40 has the conductive separator 4 attached to the oxygen electrode 2 of the three-layer structure. Alternatively, the conductive separator 4 may be attached to the fuel electrode 3 of the three-layer structure, with the cells 40 forming a cell assembly 41 stacked as in the described embodiments. In this case, the intracellular passages "x" are opposed to the fuel electrodes 3 to act as fuel gas passages "f", and the intercellular passages "y" are opposed to the oxygen electrodes 2 to act as oxygen-containing gas passages "s".

(9) The eighth embodiment employs the cutouts acting as engaging elements. However, projections may be provided instead of the cutouts. In this case, grooves may be defined in the second wall members for engaging the projections.

What is claimed is:

1. A fuel cell system comprising:
cells (40) in form of rectangular plates defined by two pairs of parallel sides; each cell including:
an electrolyte layer (1) having an oxygen electrode (2) applied to one surface thereof and a fuel electrode (3) applied to the other surface; and
a passage-defining member (4) for defining intracellular passages (x) opposed to one of said oxygen electrode (2) and said fuel electrode (3);
said cells (40) being stacked in a spaced relationship to form a cell assembly (41), with intercellular passages (y) formed between said cells; and a plurality of pairs of cell holders (5), each pair for holding one of said cells;
wherein said intracellular passages (x) are open at one of said pairs of parallel sides and closed at the other of said pairs of parallel sides of each cell;
said intercellular passages (y) are closed at said sides (40b) where said intracellular passages (x) are open, and open at said sides (40c) where said intracellular passages (x) are closed;
said cell holders (5) define notches (51) for receiving the opposite sides (40a) where said intracellular passages (x are open;
said notch
said notches (51) each include contact surfaces (53) for contact with said closed sides (40c) adjacent opposite ends of each of said open sides (40a), each of said notches having substantially the same depth as a thickness of one of said cells; and
said cell assembly (41) is formed by said cells (40) stacked with said open sides (40a) fitted into said notches (41) of opposed pairs of said cell holders (5).

2. A fuel cell system as defined in claim 1, wherein said cell holders (5) define bores (52) opposed to said notches (51) and extending in a stacking direction of said cells, respectively, said bores define ducts extending in said stacking direction to act as intracellular passage gas ducts (X1, X2) communicating with said intracellular passages (x).

3. A fuel cell system as defined in claim 2, further comprising at least one partition mounted to cover at least one of side surfaces (41A) of said cell assembly (41) where said intercellular passages (y) are open, and to bridge a wall surface (5B, 5C) defined by end surfaces of said cell holders (5) stacked at one side and a wall surface (5B, 5C) defined by end surfaces of said cell holders (5) stacked at the other side, whereby said partition defines intercellular passage gas ducts (Y1, Y2) communicating with said intercellular passages (Y).

4. A fuel cell system as defined in claim 1, wherein each of said cell holders (5) defines a blade (54) left after formation of said notch (51), said blade closing opposite sides of a space between adjacent pair of said cells to define one of said intercellular passages (y) between said cells.

5. A fuel cell system as defined in claim 4, wherein said intracellular passages (x) and said intercellular passage (y) are partitioned from each other by the blades (54) and contact surfaces (53) of said cell holders (5) holding the cell (40), and reverse surfaces of adjacent cell holders (5), placed in contact with peripheries of said open end surfaces (40b).

6. A fuel cell system as defined in claim 1, further comprising:

a box-shaped housing (90) for enclosing said cell assembly (41); and partition means (19) for defining intercellular passage gas ducts (Y1, Y2) partitioned from an interior of said box-shaped housing (90) and communicating with said intercellular passages (y), said partition means being mounted to cover at least one of side surfaces of said cell assembly (41) where said intercellular passages (y) are open, and to bridge a wall surface (5B, 5C) defined by end surfaces of said cell holders (5) stacked at one side and a wall surface (5B, 5C) defined by end surfaces of said cell holders (5) stacked at the other side.

7. A fuel cell system as defined in claim 3, further comprising:

grooves (5d) formed in said wall surfaces (5B, 5C) to extend over an entire length in said stacking direction, respectively, said partition means (19) being connected to said wall surfaces (5B, 5C) with opposite edges thereof fitted in said grooves (5d).

8. A fuel cell system as defined in claim 3, wherein said partition means (19) includes bent portions (19a) disposed at an end thereof in said stacking direction for closing openings at ends in said stacking direction of said intercellular passage gas ducts (Y1, Y2).

9. A fuel cell system as defined in claim 3, wherein said partition means (19) has an end thereof projecting in the stacking direction from the cell assembly (41).

10. A fuel cell system as defined in claim 9, further comprising:

means (26) for closing openings of said intercellular passage gas ducts (Y1, Y2) at ends thereof in said stacking direction, said means for closing openings defining slits (26a) for receiving the ends of said partition means (19) projecting in said stacking direction; and seals (27) fitted in said slits.

11. A fuel cell system as defined in claim 2, further comprising:

a box-shaped housing (90) for enclosing said cell assembly (41); and a pair of partitions (14) one of which interconnects a wall surface (5A, 5B) defined by end surfaces of said cell holders (5) stacked at one side, and inner surfaces of said box-shaped housing (90), the other partition (14) interconnecting a wall surface (5A) defined by end surfaces of said cell holders (5) stacked at the other side, and inner surfaces of said box-shaped housing (90), thereby dividing interior of said box-shaped housing into two parts used as intercellular passage gas ducts (Y1, Y2), respectively.

12. A fuel cell system as defined in claim 1, further comprising:

a box-shaped housing (90) for enclosing said cell assembly (41); and connecting passages (55) defined by said cell holders (5) stacked at one side and communicating with said intercellular passages (y) and an intracellular passage gas duct (X2).

13. A fuel cell system as defined in claim 12, wherein the duct defined by said bores (52) of said cell holders (5) having said connecting passages (55) is used as a combination of said intracellular passage gas duct (X2) and an intercellular passage gas duct (Y2).

14. A fuel cell system as defined in claim 1, wherein at least one of said contact surfaces (53) is inclined to approach the other contact surface toward said open side (40a) as seen in a stacking direction of said cells, said closed side (40c) defining an incline (40d) for contact with said inclined contact surface (53).

15. A fuel cell system as defined in claim 1, further comprising collecting plate holders (8) arranged at each of opposite ends, in said stacking direction thereof, of a stacking structure of said cells (40) stacked with said opposite open sides (40a) fitted into said notches (51) of said cell holders (5) arranged at opposite sides of said cells.

16. A fuel cell system as defined in claim 1, further comprising a gas exhaust duct (E) disposed adjacent end surfaces of said cells (40), wherein said intracellular passages (x) exhaust an oxygen-containing gas toward said gas exhaust duct, and said intercellular passages (y) exhaust a fuel gas toward said gas exhaust duct, said intracellular passages (x) including oxygen-containing gas passage extensions (Ls) extending to positions spaced from said end surfaces of said cells, so that said intracellular passages have outlets (so) opening in positions spaced from said end surfaces, said intercellular passages (y) including fuel gas passage extensions (Lf) extending to positions spaced from said end surfaces of said cells, so that said intercellular passages (y) have outlets (fo) opening in positions spaced from said end surfaces.

17. A fuel cell system as defined in claim 16, wherein said cell holders (5) arranged between adjacent cells (40) to maintain spaces therebetween project toward said gas exhaust duct (E), said fuel gas passage extensions (Lf) being defined by penetrating portions (P) extending through said cell holders (5) from end surfaces opposed to said intercellular passages (y) to end surfaces opposed to said gas exhaust duct (E), said oxygen-containing gas passage extensions (Ls) being formed between adjacent cell holders (5).

18. A fuel cell system as defined in claim 1, further comprising grooves (58, 59) formed in surfaces of said cell holders contacting said cells, said grooves being filled with seals.

19. A fuel cell system as defined in claim 16, wherein said cells (40) have a rectangular shape, said oxygen-containing gas passage extensions (Ls) and said fuel gas passage extensions (Lf) being formed at one of the four end surfaces of each cell (40), inlets (si) of said intracellular passages (x) being formed at the end surface opposed to the end surface providing said oxygen-containing gas passage extensions (Ls) and said fuel gas passage extensions (Lf), inlets (fi) of said intercellular passages (y) being formed at opposite end surfaces adjacent the end surface providing said oxygen-containing gas passage extensions (Ls) and said fuel gas passage extensions (Lf).

20. A fuel cell system as defined in claim 1, further comprising intracellular passage gas ducts (X1, X2) arranged adjacent end surfaces of said cells, said cell holders (5) including engaging portions (5e) formed in end surfaces (5f) thereof opposed to said intracellular passage gas ducts (X1, X2), for forming said intracellular passage gas ducts (X1, X2).

21. A fuel cell system as defined in claim 20, wherein each of said intracellular passage gas ducts (X1, X2) is defined by members including a first wall member (60) and a pair of second wall members (61), each of said second wall members including a stepped portion (61b) fitted into one of said engaging portions (5e).

22. A fuel cell system as defined in claim 21, wherein each of said intracellular passage gas ducts (X1, X2) is defined by members including one metal plate.

23. A fuel cell system as defined in claim 21, further comprising:

a box-shaped housing (90) for enclosing said cell assembly (41); and a pair of partitions (14) one of which interconnects one of said first wall members (60) or second wall members (62) and inner surfaces of said box-shaped housing (90), the other partition (14) interconnecting the other of said first wall members (60) or second wall members (62) and inner surfaces of said box-shaped housing (90), thereby dividing interior of said box-shaped housing into two parts used as intercellular passage gas ducts (Y1, Y2), respectively.

24. A fuel cell system as defined in claim 2, further comprising:

a box-shaped housing (90) for enclosing said cell assembly (41); and connecting passages (55) defined by said cell holders (5) stacked at one side and communicating with said intercellular passages (y) and said bores (52).

25. A fuel cell system as defined in claim 2, further comprising collecting plate holders (8) arranged at each of opposite ends, in said stacking direction thereof, of a stacking structure of said cells 40 stacked with said opposite open sides (40a) fitted into said notches (51) of said cell holders (5) arranged at opposite sides of said cells.

26. A fuel cell system as defined in claim 20, further comprising:

a box-shaped housing (90) for enclosing said cell assembly (41); and connecting passages (55) defined by said cell holders (5) stacked at one side and communicating with said intercellular passages (y) and an intracellular passage gas duct (X2).

27. A fuel cell system as defined in claim 20, further comprising collecting plate holders (8) arranged at each of opposite ends, in said stacking direction thereof, of a stacking structure of said cells 40 stacked with said opposite open sides (40a) fitted into said notches (51) of said cell holders (5) arranged at opposite sides of said cells.

28. A fuel cell system as defined in claim 1, wherein said cells are stacked vertically.

29. A fuel cell system as defined in claim 1, wherein said cells are stacked horizontally.

* * * * *

UNITED STATES PATENT AND TRADEMARK OFFICE
CERTIFICATE OF CORRECTION

PATENT NO. : 5,750,280
DATED : May 12, 1998
INVENTOR(S) : Kosuke AKAGI

It is certified that error appears in the above-identified patent and that said Letters Patent is hereby corrected as shown below:

In column 4, line 63, after "system" add -- . --.

In column 9, last line, change "25 — 35" to -- 35 — 35 --.

In column 21, line 27, after the second occurrence of "notch 51" delete "to the thickness" and substitute therefor --has a depth--.

In Claim 1, column 24, line 49, after "(x" add -- ) --.

In Claim 1, column 24, line 50, delete "said notch".

Signed and Sealed this

Seventh Day of September, 1999

Attest:

Q. TODD DICKINSON

*Attesting Officer*   Acting Commissioner of Patents and Trademarks